United States Patent
Udupa et al.

(10) Patent No.: US 12,393,829 B2
(45) Date of Patent: Aug. 19, 2025

(54) METHODS AND SYSTEMS WITH CONVOLUTIONAL NEURAL NETWORK (CNN) PERFORMANCE

(71) Applicant: Samsung Electronics Co., Ltd., Suwon-si (KR)

(72) Inventors: Pramod Parameshwara Udupa, Bangalore (IN); Kiran Kolar Chandrasekharan, Bangalore (IN); Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1197 days.

(21) Appl. No.: 16/935,500

(22) Filed: Jul. 22, 2020

(65) Prior Publication Data
US 2021/0027151 A1  Jan. 28, 2021

(30) Foreign Application Priority Data

Jul. 25, 2019 (IN) .............................. 201941030175
Mar. 2, 2020 (KR) ........................ 10-2020-0026125

(51) Int. Cl.
G06N 3/063 (2023.01)
G06N 3/04 (2023.01)
G06N 3/082 (2023.01)

(52) U.S. Cl.
CPC ............... *G06N 3/063* (2013.01); *G06N 3/04* (2013.01); *G06N 3/082* (2013.01)

(58) Field of Classification Search
CPC .......... G06N 3/063; G06N 3/04; G06N 3/082; G06N 3/045
See application file for complete search history.

(56) References Cited

U.S. PATENT DOCUMENTS 9,411,726 B2  8/2016  Ovsiannikov et al.
10,755,126 B2  8/2020  Son et al.
(Continued)

FOREIGN PATENT DOCUMENTS

CN  102831633 B  1/2015
CN  108846445 A  11/2018
(Continued)

OTHER PUBLICATIONS

Albericio et al., 2016. Cnvlutin: ineffectual-neuron-free deep neural network computing. SIGARCH Comput. Archit. News 44, 3 ( Jun. 2016) (Year: 2016).*

Hyeonuk Kim, Jaehyeong Sim, Yeongjae Choi and Lee-Sup Kim, "A kernel decomposition architecture for binary-weight Convolutional Neural Networks," 2017 54th ACM/EDAC/IEEE Design Automation Conference (DAC), Austin, TX, USA, 2017, pp. 1-6 (Year: 2017).*

(Continued)

*Primary Examiner* — James D. Rutten
(74) *Attorney, Agent, or Firm* — NSIP Law

(57) ABSTRACT

A processor-implemented method for generating Output Feature Map (OFM) channels using a Convolutional Neural Network (CNN), include a plurality of kernels, includes generating at least one encoded Similar or Identical Inter-Kernel Weight (S/I-IKW) stream, converting, similar and identical weights in the at least one non-pivot kernel to zero to introduce sparsity into the at least one non-pivot kernel, broadcasting at least one value to the at least one non-pivot kernel, and generating at least one OFM channel by accumulating an at least one previous OFM value with any one or any combination of any two or more of a convolution of non-zero weights of the pivot kernel and pixels of the Input Feature Map (IFM), the at least one broadcasted value, and a convolution of non-zero weights of the at least one non-pivot kernel and pixels of the IFM.

19 Claims, 24 Drawing Sheets

(56) References Cited

U.S. PATENT DOCUMENTS

| | | |
|---|---|---|
| 2016/0342888 A1 | 11/2016 | Yang et al. |
| 2016/0358070 A1* | 12/2016 | Brothers .............. G06N 3/082 |
| 2016/0379108 A1 | 12/2016 | Chung et al. |
| 2017/0103320 A1 | 4/2017 | Henry et al. |
| 2018/0129935 A1* | 5/2018 | Kim .................. G06F 17/153 |
| 2018/0276534 A1 | 9/2018 | Henry |
| 2019/0188526 A1* | 6/2019 | Chen .................... G06F 18/24 |
| 2020/0210759 A1* | 7/2020 | Chou .................... G06N 5/04 |

FOREIGN PATENT DOCUMENTS

| | | | |
|---|---|---|---|
| KR | 10-2018-0050928 A | 5/2018 |
| KR | 10-2018-0052063 A | 5/2018 |

OTHER PUBLICATIONS

Wu et al., "Deep k-Means: Re-Training and Parameter Sharing with Harder Cluster Assignments for Compressing Deep Convolutions", Jul. 15, 2018, Proceedings of the 35th International Conference on Machine Learning, in Proceedings of Machine Learning Research 80:5363-5372 (Year: 2018).*

D. Kim, J. Ahn and S. Yoo, "ZeNA: Zero-Aware Neural Network Accelerator," in IEEE Design & Test, vol. 35, No. 1, pp. 39-46, Feb. 2018, doi: 10.1109/MDAT.2017.2741463. (Year: 2018).*

Hegde, Kartik, et al., "UCNN: Exploiting Computational Reuse in Deep Neural Networks via Weight Repetition," *2018 ACM/IEEE 45th Annual International Symposium on Computer Architecture (ISCA). IEEE*, 2018 (pp. 1-14).

* cited by examiner

METHODS AND SYSTEMS WITH CONVOLUTIONAL NEURAL NETWORK (CNN) PERFORMANCE

CROSS-REFERENCE TO RELATED APPLICATIONS

This application claims the benefit under 35 USC 119(a) of Indian Patent Application No. 201941030175, filed on Jul. 25, 2019 in the Indian Patent Office, and Korean Patent Application No. 10-2020-0026125, filed on Mar. 2, 2020, in the Korean Intellectual Property Office, the entire disclosures of which are incorporated herein by reference for all purposes.

BACKGROUND

1. Field

The following description relates to methods and systems a Convolutional Neural Network (CNN) performance.

2. Description of the Related Art

Deep learning using CNN may involve significant computational costs such as performing millions or even billions of multiplication and accumulation operations per second. The computation operations may be performed either at a Convolutional (Cony) layer or a Fully Connected (FC) layer, for example. The convolution operation may involve sliding a kernel, (for example: a 3-Dimensional (3-D) kernel, across a 3D Input Feature Map (IFM), wherein multiplications are performed between respective IFM pixels and respective kernel weights in each layer of a CNN. The products may be accumulated to generate respective Output Feature Map (OFM) pixels of each layer of the CNN.

The typical convolution approaches attempt to minimize the computational costs, by exploiting sparsity in an IFM and kernel. The sparsity may indicate the number of zero valued weights in the IFM and/or the kernel. If the values of weights of elements in the IFM or kernel are zero, then there is no necessity for computing products. Thus, computational costs may be reduced. Sparsity introduced in the kernel may be based on a pruning method used during CNN training phase. The pruning may impact inference accuracy of the CNN, wherein overpruning used may lead to degradation of the accuracy of the CNN.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method for generating Output Feature Map (OFM) channels using a Convolutional Neural Network (CNN), including a plurality of kernels, includes generating, by one or more processors, at least one encoded Similar or Identical Inter-Kernel Weight (S/I-IKW) stream, based on a comparison of weights of a pivot kernel and weights of at least one non-pivot kernel, wherein the at least one encoded S/I-IKW stream is associated with the at least one non-pivot kernel, converting, by the one or more processors, similar and identical weights in the at least one non-pivot kernel to zero to introduce sparsity into the at least one non-pivot kernel, wherein the similar and identical weights are identified based on the comparison of the weights of the pivot kernel and the weights of the at least one non-pivot kernel, broadcasting, by a Neural Processing Unit (NPU), at least one value to the at least one non-pivot kernel, wherein the at least one value is determined based on any one or any combination of any two or more of at least one product of at least one pixel of an Input Feature Map (IFM) and at least one weight of the pivot kernel, the at least one pixel of the IFM, and the at least one S/I-IKW stream associated with the at least one non-pivot kernel, and generating, by the NPU, at least one OFM channel by accumulating an at least one previous OFM value with any one or any combination of any two or more of a convolution of non-zero weights of the pivot kernel and pixels of the IFM, the at least one broadcasted value, and a convolution of non-zero weights of the at least one non-pivot kernel and pixels of the IFM.

A first weight of a pivot kernel and a second weight of the at least one non-pivot kernel may be considered identical if a condition is satisfied, wherein the condition may be one of the first weight and the second weight being equal in magnitude and sign, and the first weight and the second weight being equal in magnitude and opposite in sign.

A first weight of a pivot kernel and a second weight of the at least one non-pivot kernel may be considered similar if a difference between magnitude of the first weight and the second weight is within a similarity threshold, wherein the first weight and the second weight may be one of equal in sign and opposite in sign.

A number of entries of an S/I-IKW stream associated with a non-pivot kernel may be based on a number of non-zero weights in the pivot kernel, wherein each entry of the S/I-IKW stream may be encoded based on whether the weights of the pivot kernel and the weights of the at least one non-pivot kernel are one of unequal, identical, and similar.

The pivot kernel may be determined from among the plurality of kernels based on performing a mutual comparison of weights of each of the plurality of kernels, wherein the comparison may be performed if locations of the weights of a kernel pair to be compared are identical, determining a score of comparison for each of the plurality of kernels, wherein the score of comparison of a kernel may be determined by accumulating numbers of weights of the kernel that are similar or identical to the weights of each of the plurality of kernels excluding the kernel, and selecting a kernel with a highest score of comparison as the pivot kernel, wherein kernels excluding the pivot kernel may be identified to be the non-pivot kernels.

The method may further include performing a bitwise splitting of accumulators in each of a pivot Multiply-Accumulate Unit (MAU) and at least one non-pivot MAU, wherein the pivot MAU may include the pivot kernel and the at least one non-pivot MAU may include the at least one non-pivot kernel.

Each of the kernels may have dimensions of size H, W, and Z, and H may equal W.

The NPU may perform the generating for the at least one OFM channel in parallel.

In another general aspect, a non-transitory computer-readable storage medium stores instructions that, when executed by one or more processors, cause the one or more processors to perform the method described above.

In another general aspect, a system for generating Output Feature Map (OFM) channels using a Convolutional Neural Network (CNN), including a plurality of kernels, includes one or more processors configured to generate at least one encoded Similar/Identical Inter-Kernel Weight (S/I-IKW) stream, based on a comparison of weights of a pivot kernel and weights of at least one non-pivot kernel, wherein the at least one encoded S/I-IKW stream is associated with the at least one non-pivot kernel, and convert similar and identical weights in the at least one non-pivot kernel to zero to introduce sparsity into the at least one non-pivot kernel, and a Neural Processing Unit (NPU) configured to broadcast at least one value to the at least one non-pivot kernel, wherein the at least one value is determined based on any one or any combination of any two or more of at least one product of at least one pixel of an Input Feature Map (IFM) and at least one weight of the pivot kernel, the at least one pixel of the IFM, and the at least one S/I-IKW stream associated with the at least one non-pivot kernel, and generate at least one OFM channel by accumulating an at least one previous OFM value with any one or any combination of any two or more of a convolution of non-zero weights of the pivot kernel and pixels of the IFM, the at least one broadcasted value, and a convolution of non-zero weights of the at least one non-pivot kernel and pixels of the IFM.

A first weight of a pivot kernel and a second weight of the at least one non-pivot kernel may be considered identical if a condition is satisfied, wherein the condition may be one of the first weight and the second weight being equal in magnitude and sign, and the first weight and the second weight being equal in magnitude and opposite in sign.

A first weight of a pivot kernel and a second weight of the at least one non-pivot kernel may be considered similar if a difference between magnitude of the first weight and the second weight is within a similarity threshold, wherein the first weight and the second weight may be one of equal in sign and opposite in sign.

A number of entries of an S/I-IKW stream associated with a non-pivot kernel may be based on a number of non-zero weights in the pivot kernel, wherein each entry of the S/I-IKW stream may be encoded based on whether the weights of the pivot kernel and the weights of the at least one non-pivot kernel are one of unequal, identical, and similar.

The pivot kernel may be determined from among the plurality of kernels by performing a mutual comparison of weights of each of the plurality of kernels, wherein the comparison may be performed if locations of the weights of a kernel pair to be compared are identical, determining a score of comparison for each of the plurality of kernels, wherein the score of comparison of a kernel may be determined by accumulating numbers of weights of the kernel that are similar or identical to the weights of each of the plurality of kernels excluding the kernel, and selecting a kernel with a highest score of comparison as the pivot kernel, wherein kernels excluding the pivot kernel may be identified to be the non-pivot kernels.

The system may be further configured to perform a bitwise splitting of accumulators in each of a pivot Multiply-Accumulate Unit (MAU) and at least one non-pivot MAU, wherein the pivot MAU may include the pivot kernel and the at least one non-pivot MAU may include the at least one non-pivot kernel.

Each of the kernels may have dimensions of size H, W, and Z, and H may equal W.

The NPU may perform the generating for the at least one OFM channel in parallel.

Other features and aspects will be apparent from the following detailed description, the drawings, and the claims.

DETAILED DESCRIPTION

Figure 1:
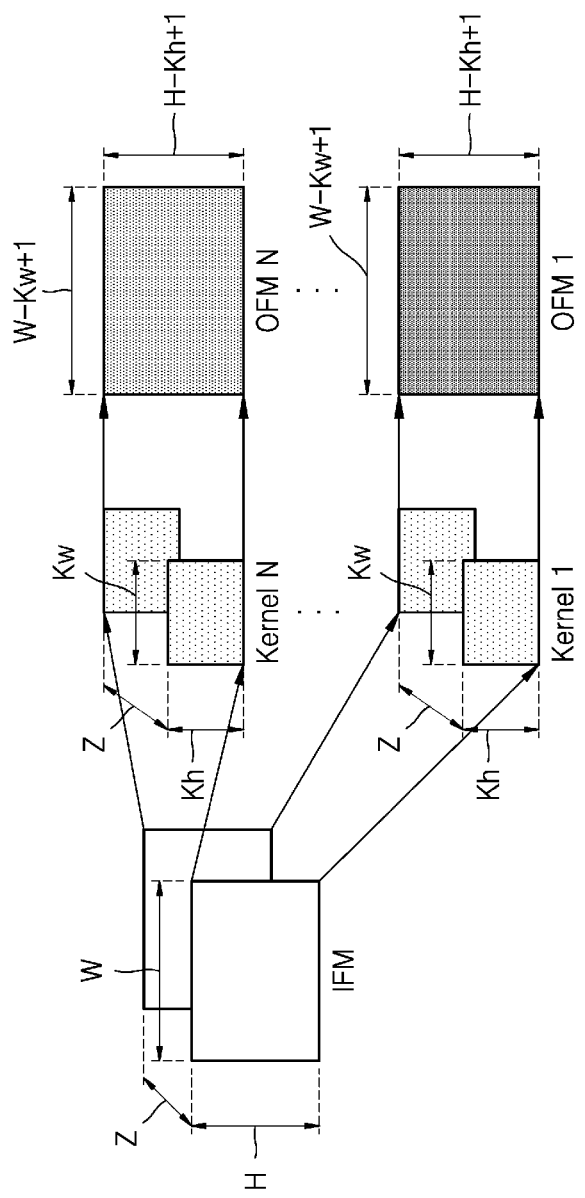
FIG. 1 depicts a convolution operation performed between an Input Feature Map (IFM) and a plurality of kernels to generate an Output Feature Map (OFM), according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limited to those explicitly described or as limiting the scope of the embodiments herein.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Currently, Convolutional Neural Network (CNN) technology is used in areas such as image processing, such as for feature detection, classification, and analysis, medical diagnosis, such as for analyzing medical images, navigation applications, such as for recommending routes, natural language processing, and so on.

An aspect of the examples presented herein is to optimize convolution operations by reducing the total number of multiplication operations performed in each layer of the CNN, by transforming the multiplication operations to addition operations.

One or more embodiments presented herein disclose methods and systems that may improve performance of a Convolutional Neural Network (CNN) by exploiting similar and/or identical weights across different kernels. For example, a plurality of kernels exists, wherein weights of each of the plurality of kernels in a particular layer of the CNN are mutually compared. The weights of each of the plurality of kernels may be compared, if the location of the weights is same. Such a location of a weight of a kernel may be specified using a channel number and position coordinates. For example, an example exists in which there are three kernels. One or more embodiments may include determining a number of weights of a first kernel that are similar or identical to weights of a second kernel and a number of weights of a first kernel that are similar or identical to weights of a third kernel. One or more embodiments may include obtaining a score of comparison for the first kernel, by accumulating the numbers of similar or identical weights. One or more embodiments may also include obtaining, similarly, the scores of comparison that are appropriate for the second and third kernels, which are examples of the other plurality of kernels. One or more embodiments may also include identifying a kernel having the highest score of comparison, amongst the plurality of kernels, as the pivot kernel. The rest of the kernels may be considered as being non-pivot kernels, for example.

One or more embodiments may include generating encoded Similar or Identical Inter-Kernel Weights (S/I-IKW) streams, based on the comparison of the weights of the pivot kernel with the weights of each of the non-pivot kernels. The weights of the non-pivot kernels that are similar or identical to the weights of the pivot kernel may be set to zero, in order to introduce sparsity into the non-pivot kernels. Based on the S/I-IKW streams, the pivot kernel may choose whether to broadcast products, which may be products of pixels of an Input Feature Map (IFM) and the weights of the pivot kernel, to the non-pivot kernels. The products may be broadcast to a non-pivot kernel, if the weights of the pivot kernel match with the weights of the non-pivot kernel, which may be determined by the pivot kernel from the S/I-IKW stream, associated with the non-pivot kernel. The non-pivot kernel may utilize the broadcasted products to determine an Output Feature Map (OFM), instead of computing the products of weights of the non-pivot kernel, which may be similar or identical to the weights of the pivot kernel, with the pixels of the IFM.

Referring now to the drawings, and more particularly to FIGS. 1 through 23B, where similar reference characters denote corresponding features consistently throughout the figures, there are shown various embodiments.

FIG. 1 depicts a convolution operation performed between an IFM and a plurality of kernels to generate an OFM, according to one or more embodiments. As depicted in FIG. 1, the dimensions of the IFM are of size "H," "W," and "Z." Consider that "N" number of kernels is used. The dimensions of each of the kernels are of size "Kh," "Kw," and "Z." The number of channels of the IFM and the number of channels of each of the kernels are identical, that is, "Z." Because "N" kernels are used, the number of channels of the OFM may be "N." The dimensions of the OFM are of size (H−Kh+1), (W−Kw+1), and N. The convolution, performed to generate an OFM channel, may be performed by sliding a kernel over the IFM, such that products of the IFM pixels and the kernel weights of that kernel are computed and accumulated at each position. The OFM of a channel may be obtained by sliding a channel of the kernel over an IFM channel, wherein the IFM channel and kernel channel may be corresponding same depths or channels. Similarly, other OFM channels may be obtained by sliding the respective other kernels over the IFM used for respectively convoluting the IFM pixels and the weights of other kernels.

Figure 2:
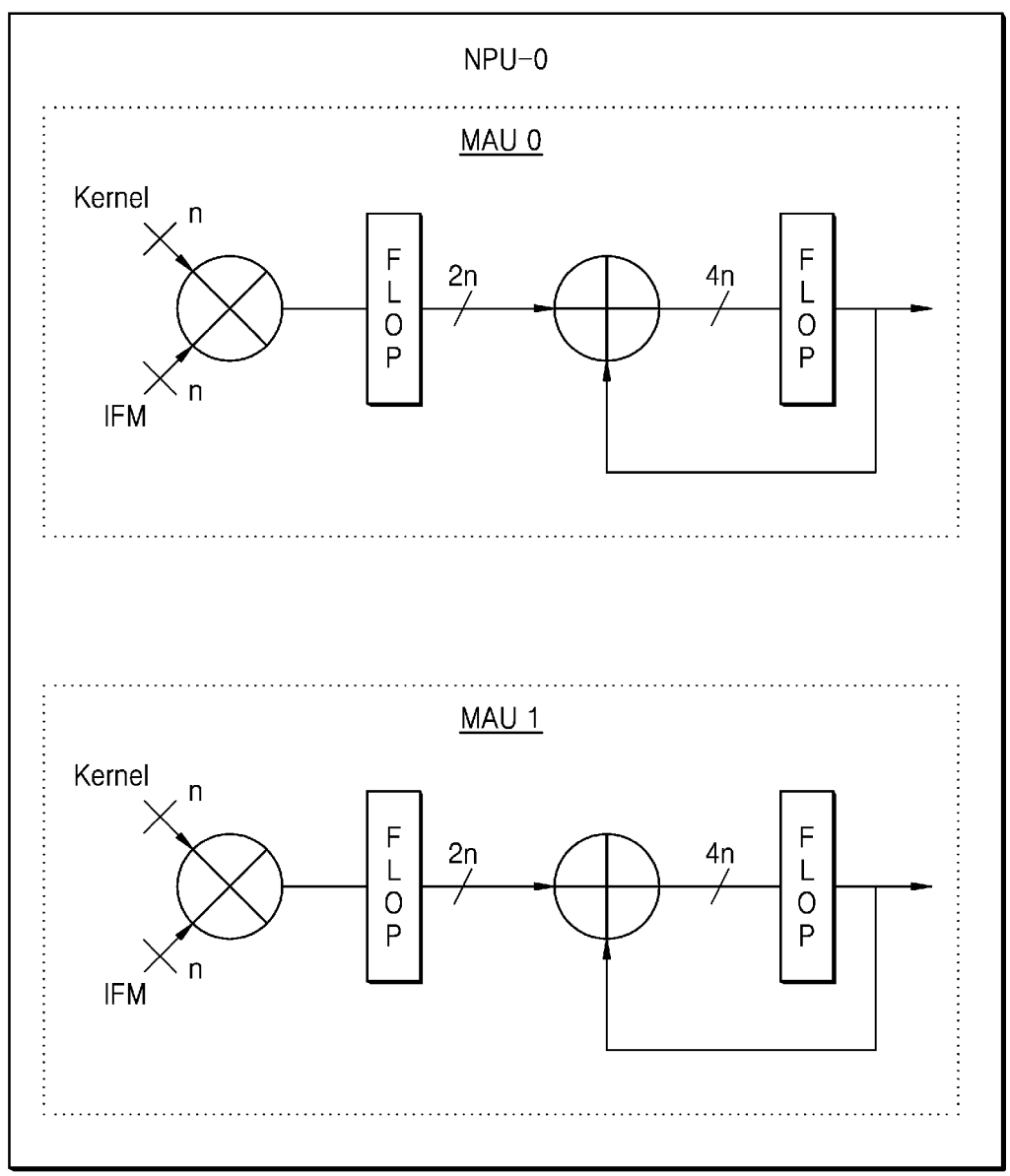
FIG. 2 depicts a Neural Processing Unit (NPU), according to one or more embodiments.

FIG. 2 depicts architecture of a Neural Processing Unit (NPU)-0 having computation and memory units, according to one or more embodiments. The NPU may read IFM and kernel weights and may compute an OFM accordingly. The OFM may be stored in the memory unit. The computation unit may include Multiply-Accumulate Units (MAUs) that may perform multiplication and accumulation operations. Two MAUs are depicted as a non-limiting example.

Typically, such two MAUs, e.g., a MAU A and MAU B, would function independently. In this typical example, such a MAU A may perform a convolution operation between an IFM and a kernel in order to generate a channel of an OFM, MAU B may perform a convolution operation between the IFM and another kernel, in order to generate another channel of this OFM, with convolution operations in MAUs A and B being performed independently from each other. Therefore, in the the typical architecture with independent operation, the computation complexity may be high.

Figure 3:
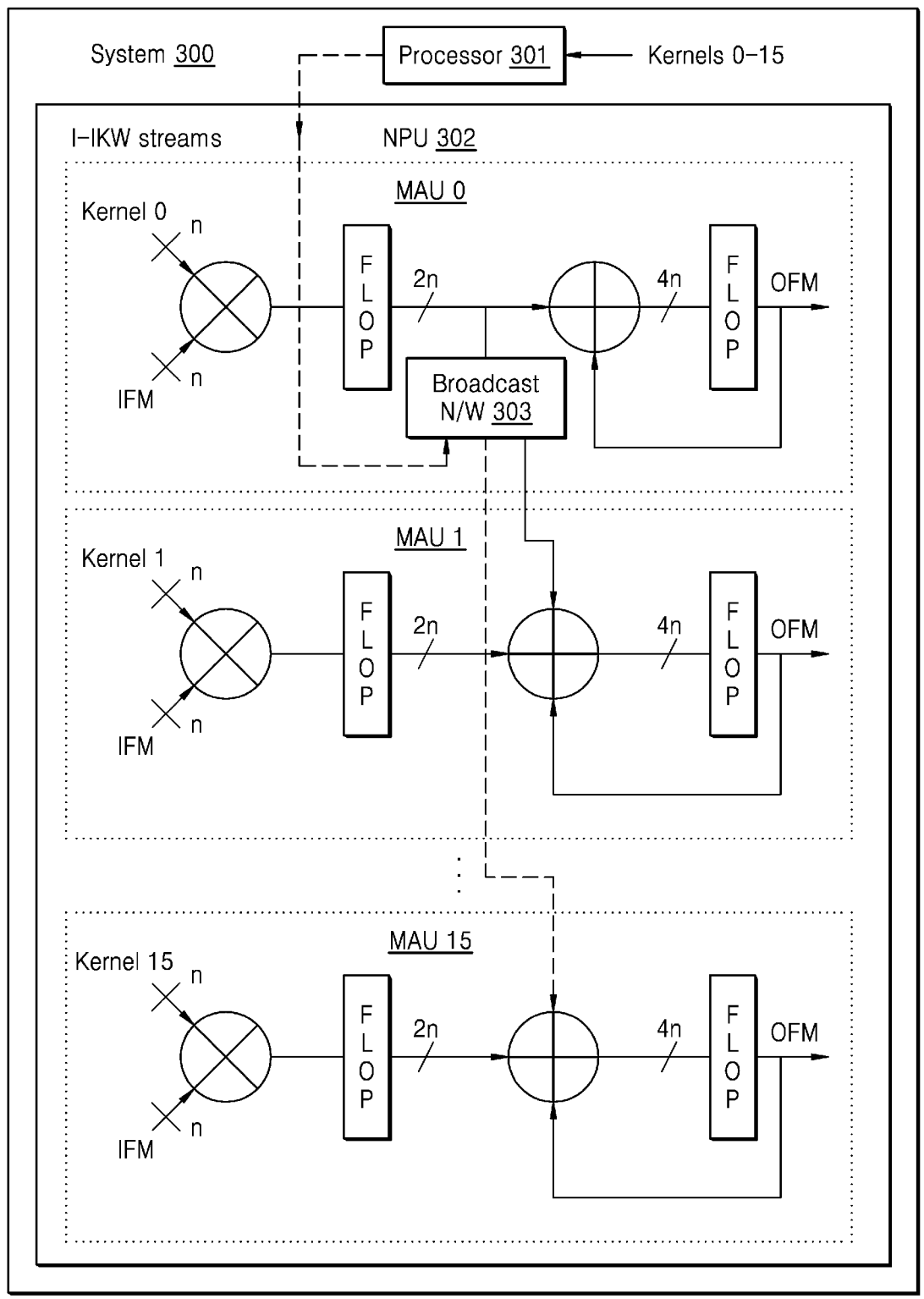
FIG. 3 depicts a system with performance optimization of a CNN by exploiting identical weights in different kernels, according to one or more embodiments.

FIG. 3 depicts a system 300 with performance optimization of a CNN by exploiting identical weights in different kernels, according to one or more embodiments. As depicted in the one or more embodiments of FIG. 3, the system 300 may include a processor 301 and a Neural Processing Unit (NPU) 302, as a non-limiting example. In one or more embodiments discussed herein, the architecture of the NPU 302 may be of type 0. As described herein, a type 0 architecture, IFM pixels in same 2-Dimensional (2-D) plane may be packed together in memory. That is, pixels that have the same channel number but different (x, y) coordinates or positions may be packed together in a single word. The traversal of the kernel and IFM may be based on such packing.

The NPU 302 may include a plurality of Multiply-Accumulate Units (MAUs). In one or more embodiments, 16 MAUs may be included in a Multiply-Accumulate Array (MAA), as non-limiting example. In an example, 16 MAAs may be included in a MAA Set. Thus, in such an example, 4 MAA sets may be included in the NPU. For the sake of explanation, a single MAA, including 16 MAUs, is depicted as a non-limiting example. For each kernel, a MAU may perform a convolution operation of pixels of an IFM using weights of the kernel. The output of each MAU may be considered as channels of an OFM, or an OFM with one channel. In various example configurations with varying hardware capability of the NPU 302, the number of convolution operations performed in parallel may be increased. According to such an example, it is shown that the NPU 302 may generate a 16 channel OFM, wherein computations in the 16 MAUs may be performed in parallel. The 16 channel OFM may be an output of a single layer of the CNN.

In one or more examples discussed herein, it is to be noted that 16 kernels, namely, kernel 1, kernel 2, and so on, may be provided to the processor 301. In one or more examples, the kernels may be pruned kernels or operations include pruning the kernels. In another example, the kernels may not be pruned. For example, the weights of the kernels may be quantized into "n" bit values. The respective dimensions and number of channels in each of the kernels may be the same. For each kernel, the processor 301 may compare the weights of the kernel with weights of the other 15 kernels. For example, weights of kernel 0 may be compared with weights of kernels 1-15; weights of kernel 1 may be compared with weights of kernels 2-15, given that the weights of kernel 1 have been compared with the weights of kernel 0, weights of kernel 2 may be compared with weights of kernels 3-15, given that the weights of kernel 2 have been compared with the weights of kernel 0 and kernel 1, and so on. The processor 301 may compare the weights in different kernels in a CNN layer only if locations, that is, channel and position, as indicated by coordinates, of the weights in the different kernels are the same.

For example, for purposes of discussion, in an example, all the kernels may have dimensions of size 3, 3, 2. Therefore, there may be 18 (3*3*2) weights and 2 channels, considered as channel 0 and channel 1, in each kernel. In each channel, there may be 9 positions in which 9 weights are present. A weight in a particular position and channel in kernel 0 may be compared with a weight in a kernel, such as, for example, kernel 8, if the position and channel of the weight in kernel 8 is the same as that of the weight in kernel 0.

For example, the processor 301 may determine the numbers of weights of kernel 0 that are identical to the weights of the kernels 1-15. The processor 301 may thus accumulate the numbers to obtain a score of comparison for kernel 0. In an example, 3 weights in kernel 0 and kernel 1 may be identical, 5 weights in kernel 0 and kernel 2 may be identical, 4 weights in kernel 0 and kernel 15 may be identical, and so on. In such an example, the processor 301 may accumulate 3, 5, . . . , 4, and so on, and may determine the score of comparison of kernel 0, accordingly. Similarly, the processor 301 may obtain the scores of comparison for the kernels 1-15 in a like manner. The processor 301 may consider the kernel having the highest score of comparison as the pivot kernel, and the rest of the kernels may be considered as non-pivot kernels. In an example, kernel 0 may be the pivot kernel and kernels 1-15 may be non-pivot kernels. The pivot kernel may be always mapped to MAU 0. Also, the pivot kernel may include a broadcast network 303.

In one or more embodiments, if there are only two kernels, then one of the kernels may be chosen as being the pivot kernel.

In order to introduce sparsity into the non-pivot kernels, the weights of the non-pivot kernels, such as kernels 1-15, which may be identical to the weights of the pivot kernel, such as kernel 0, may be set to zero. In an example, there may be two 3×3 kernels, such as, for simplicity, A and B that have a single channel. In such an example, A may be the pivot kernel and B may be the non-pivot kernel. These kernels may be represented as:

$$A = \begin{matrix} D & N & N \\ 0 & K & W \\ 0 & 0 & P \end{matrix}$$

$$B = \begin{matrix} 0 & N & N \\ I & P & R \\ K & 0 & -P \end{matrix}$$

In such an example, the index stream of kernel A may be: 1, 1, 1, 0, 1, 1, 0, 0, 1. Further, the index stream of kernel B may be: 0, 1, 1, 1, 1, 1, 1, 0, 1. The index stream may have a value of 0, if the weight is 0 and may have a value of 1, if the weight is a non-zero value.

Also, in such an example, the value stream of A may be: D, N, N, K, W, P. Here, the value stream of B may be: N, N, I, P, R, K, −P. The value stream may include the non-zero weights of the kernels.

The positions in the kernels, namely A and B, may be referred to as (i,j), where i refers to row and j refers to column, wherein i∈[0-2] and j∈[0-2]. The processor 301 may compare the weights of the kernels and may determine that the weights of the kernels A and B at positions (0,1), (0,2), and (3,3) are identical. The processor 301 may, thereafter, modify kernel B so to introduce sparsity. Thus, the modified kernel B may be, according to the present one or more embodiments:

$$B = \begin{matrix} 0 & 0 & 0 \\ I & P & R \\ K & 0 & 0 \end{matrix}$$

The index stream of modified kernel B may be: 0, 0, 0, 1, 1, 1, 1, 0, 0. Also, the value stream of modified kernel B may be: I, P, R, K. Thus, sparsity may be introduced into non-pivot kernels, in keeping with the above non-limiting example.

The processor 301 may generate encoded I-IKW streams based on the comparison of the weights of the pivot kernel, for example, kernel 0, with the weights of each of the non-pivot kernels, for example, kernels 1-15). Therefore, 15 I-IKW streams may be generated based on the comparison of the weights of kernel 0 with each of the non-pivot kernels 1-15, where each kernel is considered as having a single channel. The processor 301 may provide the 15 I-IKW streams to the broadcast network 303. In another non-limiting example, kernels 0-15 may each have three channels. In this example, three I-IKW streams may be generated for each kernel and a total of 45 I-IKW streams may be generated.

The number of entries in an I-IKW stream may be based on the number of weights having non-zero values in the pivot kernel. If the value of a weight in a particular position and channel in the pivot kernel is zero, then the pivot kernel may not contribute to minimization of computational cost at the same position and channel in the non-pivot kernels. Therefore, the I-IKW stream may not include an entry for weights with zero values in the pivot kernel. If the value of a weight in a particular position and channel in the pivot kernel and the value of a weight in the same position and channel in a non-pivot kernel are equal in both magnitude, such as with the same sign, or with an opposite sign, or alternatively unequal in magnitude, then an entry may be included in the I-IKW stream. Considering the above example of the pivot kernel A and the non-pivot kernel B, as the six weights are having non-zero values in the pivot kernel A, the number of entries in the I-IKW stream may be six.

The values of the entries of the I-IKW stream may be based on an encoding rule. In one or more embodiments, if the weights are unequal, then the value of the entry may be encoded as 0. If the weights are equal in magnitude and sign, then the value of the entry may be encoded as 2. If the weights are equal in magnitude and opposite in sign, then the value of the entry may be encoded as 3. Considering the above example of the pivot kernel A and the non-pivot kernel B, the values of the generated I-IKW stream may be 0 for (0,0), 2 for (0,1), 2 for (0,2), 0 for (1,1), 0 for (1,2), and 3 for (2, 2). Therefore, the corresponding I-IKW stream may be 0, 2, 2, 0, 0, 3.

In each MAU of the NPU 302, a convolution operation may be performed between pixels of an IFM and the weights of the kernel/modified kernel. The pivot kernel, or kernel 0, may perform the multiplication and accumulation operation for the non-zero weights. In such an example, the broadcast network 303 may choose whether to broadcast products of pixels of the IFM and the weights of kernel 0 at position (i, j) to the kernels 1-15, based on the entries at position (i, j) in the I-IKW streams that correspond to the channels in the kernels 1-15. If the value of an entry in the I-IKW stream is either 2 or 3, that is, non-zero, then the products may be broadcast to the non-pivot kernels.

Considering the above example of the pivot kernel A and the non-pivot kernel B, the modified non-pivot kernel B may not perform multiplication of weights in positions (0,1), (0,2), and (2,2) with the weights of the IFM, as the values of the weights in these positions have been converted to 0. The pivot kernel A, based on the encoded I-IKW stream, may broadcast computed products of weights of the pivot kernel, in the positions (0,1), (0,2), and (2,2), and the weights in the IFM to the non-pivot kernel B. Such broadcasting may occur because the values of entries of the I-IKW stream may correspond to the positions (0,1), (0,2), and (3,3), are 2, 2, and 3 respectively. The non-pivot kernel B may then accumulate the broadcasted products and the products of the weights of the non-pivot kernel B with non-zero values and the pixels of the IFM, appropriately. Thus, the multiplication operations may be transformed to addition operations, which may thereby reduce the computational cost, latency, and power consumption used for the non-pivot kernels, for example, kernels 1-15.

FIG. 3 shows example components of the system 300, but it is to be understood that other embodiments are not limited to the one or more embodiments of FIG. 3. In other embodiments, the system 300 may include fewer or more components. Further, the labels or names of the components are used only for illustrative purpose, and are not intended to limit the scope of the present disclosure. One or more components may be combined together to perform the same or substantially similar functions as those shown in the example system 300.

Figure 4A:
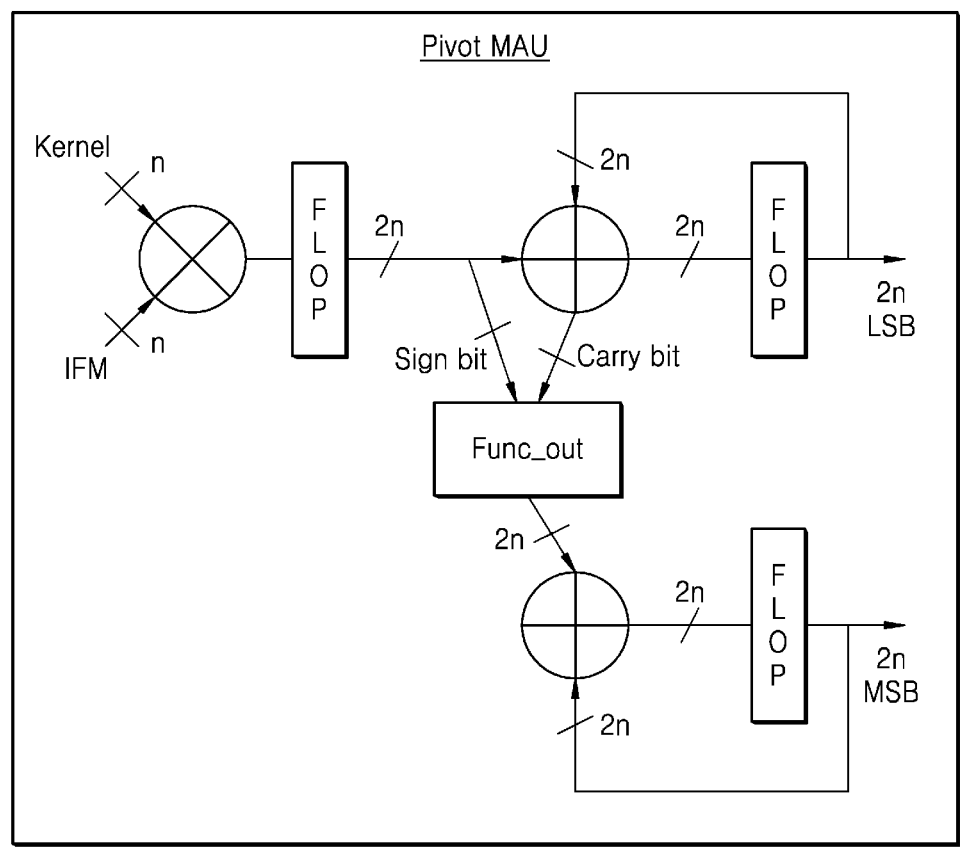
FIGS. 4A and 4B depict bitwise split architecture of accumulators in a pivot Multiply-Accumulate Unit (MAU) and a non-pivot MAU, according to one or more embodiments.
Figure 4B:
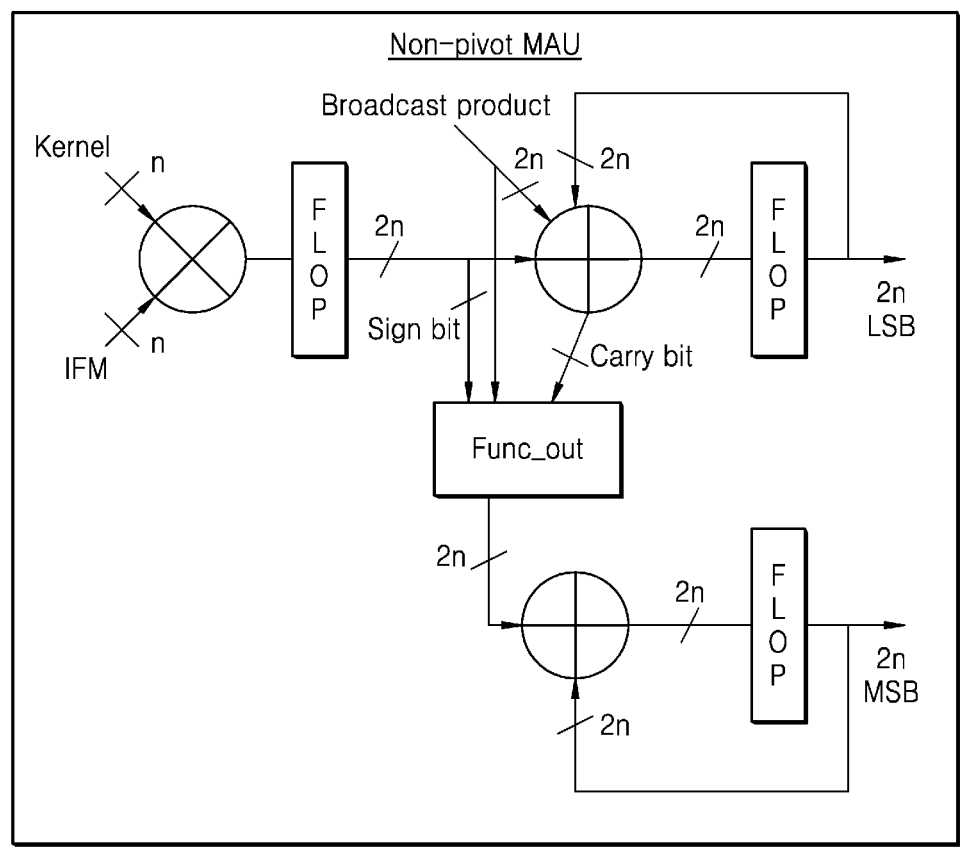

FIGS. 4A and 4B depict bitwise split architecture of accumulators in a pivot MAU and a non-pivot MAU, according to one or more embodiments. The MAU, in which multiplication of weights of the pivot kernel and the IFM pixels are performed, may be referred to as the pivot MAU. The MAUs, in which multiplication of weights of the non-pivot kernels and the IFM are performed, may be referred to as the non-pivot MAUs. By comparing the accumulators in the MAUs depicted in the one or more embodiments of FIG. 2 and the non-pivot MAUs depicted in the one or more embodiments of FIG. 3, it may be observed that the accumulators in the non-pivot MAUs may be 3-input accumulators, in such examples.

If the weights of the kernels and the IFM pixels are quantized to n-bit values, the outputs of the accumulators may be 4n-bit values. The accumulators may be designed to produce outputs, such as pixels of the OFM channels, based on the bit-widths corresponding to the weights of the IFM and the kernels. As depicted in FIGS. 4A and 4B, the 4n-bit accumulators in the pivot and non-pivot may be split into two 2n-bit lower bit and upper bit accumulators. The lower 2n-bit accumulator may generate a 2n-bit Least Significant Bit (LSB) output and the upper 2n-bit accumulator generates a 2n-bit Most Significant Bit (MSB) output.

The lower 2n-bit accumulator of the pivot kernel may accumulate a stored 2n-bit LSB accumulated value, and an incoming product of weights of the pivot kernel and the IFM pixels. The upper 2n-bit accumulator of the pivot kernel may accumulate a stored 2n-bit MSB accumulated value and a value generated based on a logic function. The generated value may be a dependent variable of the logic function. The independent variables of the logic function may be a carry bit of the accumulated value of the lower 2n-bit accumulator and the sign bit of the incoming product.

The lower 2n-bit accumulator of the non-pivot kernel may accumulate a stored 2n-bit LSB accumulated value, a product broadcasted from the pivot MAU, and an incoming product of weights of the non-pivot kernel and the IFM pixels. The upper 2n-bit accumulator of the non-pivot kernel may accumulate a stored 2n-bit MSB accumulated value and a value generated based on a logic function. The independent variables of the logic function in the pivot kernel may be a carry bit of the accumulated value of the lower 2n-bit accumulator, a sign bit of the broadcast product, and the sign bit of the incoming product.

One or more accumulation operations may be performed at the upper 2n-bit accumulators in the pivot MAU and the non-pivot MAUs, if conditional values are generated as output of the logic functions in the pivot MAU and the non-pivot MAUs. Such an approach may minimize power consumption of the upper 2n-bit accumulators.

Figure 5:
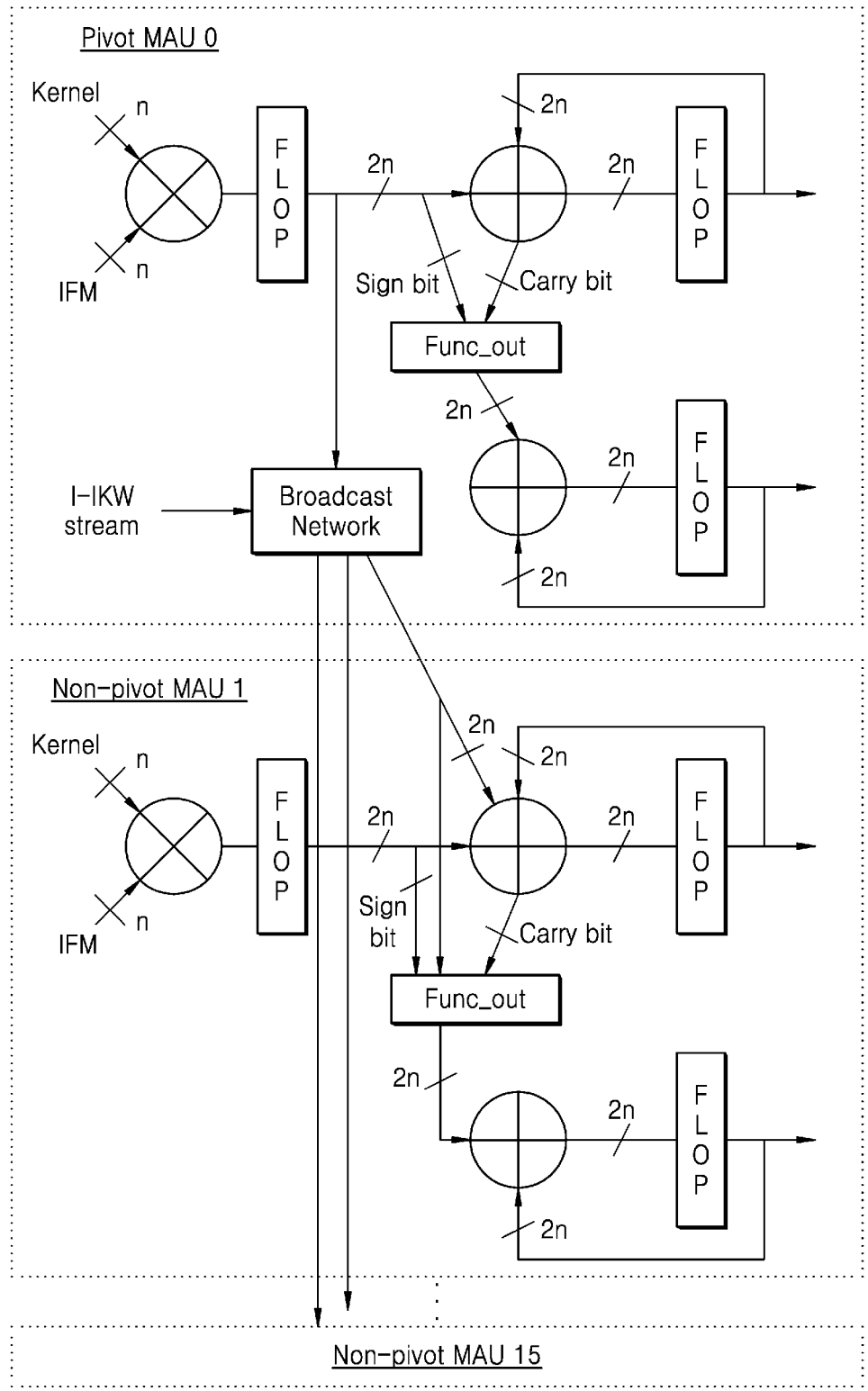
FIG. 5 depicts a Multiply-Accumulate Array (MAA) in a NPU with 16 MAUs, wherein accumulators have bitwise split architecture, according to one or more embodiments.

FIG. 5 depicts a MAA in a NPU-0 comprising of 16 MAUs, including a pivot MAU, wherein accumulators have bitwise split architecture, according to one or more embodiments. As depicted in the one or more embodiments of FIG. 5, the MAA may generate a 16 channel OFM with a minimized computational cost, latency, and power consumption. The computational cost may be minimized by introducing sparsity into the non-pivot kernels based on similarity between weights of the pivot kernel and the non-pivot kernels. The computational cost may be minimized by transforming product or multiplication operations, to be performed otherwise at the non-pivot kernels, into accumulation operations, based on the encoded I-IKW streams corresponding to the non-pivot kernels. If the computational cost is minimized in such a manner, then the latency and the power consumption may be reduced as a result. The power consumption may be further reduced by splitting the accumulators of the pivot and non-pivot kernels into two upper-bit and lower-bit accumulators.

Figure 6:
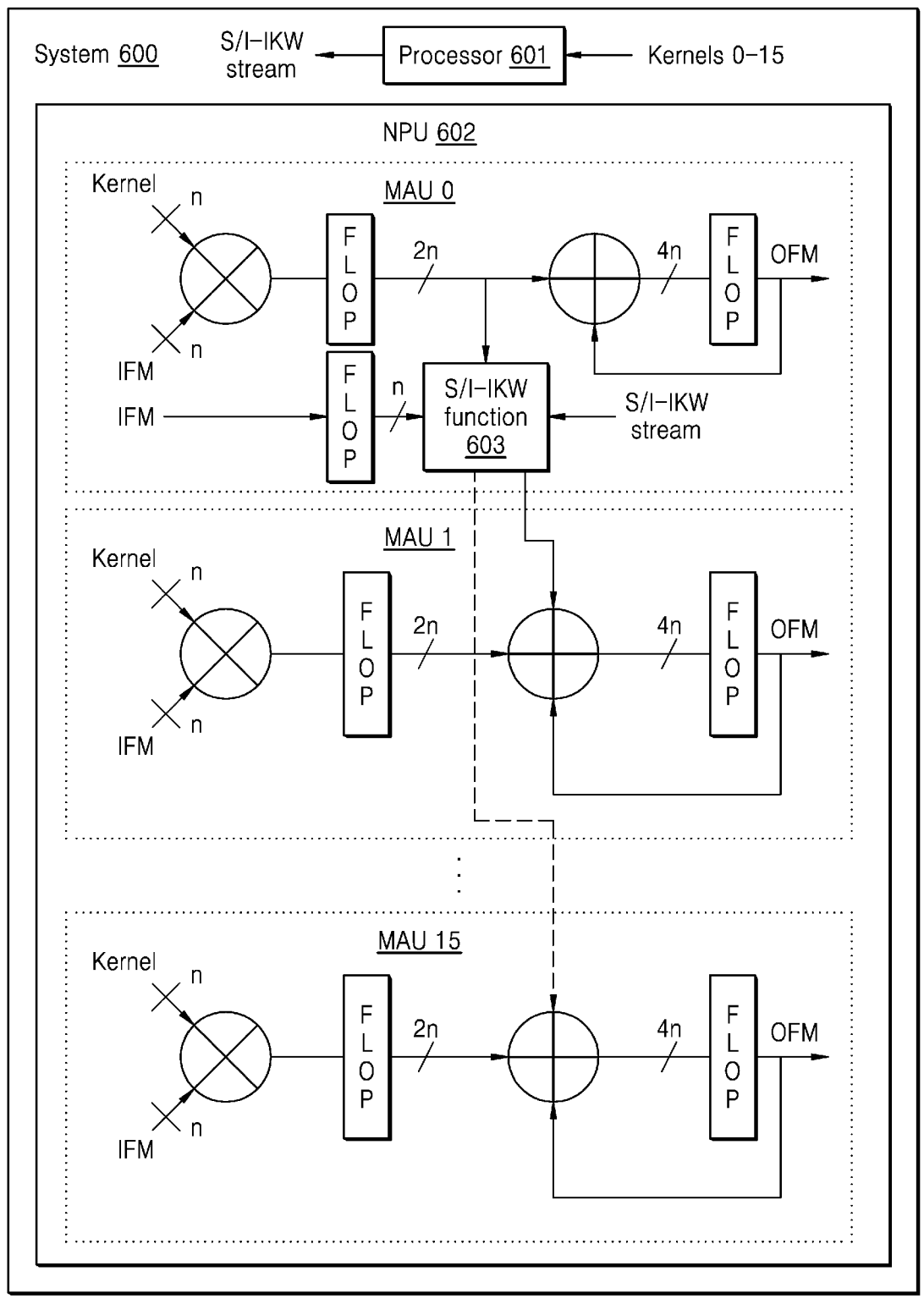
FIG. 6 depicts a system with performance optimization of a CNN by exploiting similar/identical weights in different kernels, according to one or more embodiments.

FIG. 6 depicts a system 600 configured to optimize performance of the CNN by exploiting similar/identical weights in different kernels, according to one or more embodiments. As depicted in the one or more embodiments of FIG. 6, the system 600 may include a processor 601 and a NPU 602. The architecture of the NPU 602 may be of type 0. For the sake of illustration, as a non-limiting example, a single MAA is depicted.

The processor 601 may compare the weights of each kernel with weights of the other 15 kernels, in order to detect whether the weights are similar or identical to each other. The processor 601 may compare two weights in different kernels, only if locations of the weights in the different kernels are same. The processor 601 may consider a kernel with the highest score of comparison, as discussed in greater detail with respect to the one or more embodiments of FIG. 3, as being the pivot kernel and may consider the rest of the kernels as being non-pivot kernels. In the example presented in FIG. 6, kernel 0 may be the pivot kernel and kernels 1-15 may be non-pivot kernels. Further, the pivot kernel may include an S/I-IKW function 603.

The weights of the non-pivot kernels, such as kernels 1-15, which are similar or identical to the weights of the pivot kernel, such as kernel 0, may be set to zero, in order to introduce sparsity into the non-pivot kernels. The processor 601 may also define a similarity criterion, such that weights with different values that follow the similarity criteria may be considered as similar. The similarity criteria may be based on a linear function such as differences of ±1, ±2, ±4, another multiple of 2, and so on. For example, if a similarity criterion is ±2 and the value of a weight is 15, then weights with values in the range 13-17, excluding 15, which is an identical weight, may be considered as being similar.

The weights that are within the similarity margin of magnitude, but having an opposite sign, may also be considered as being similar. With respect to one or more examples, the weights with values in the range of −13 to −17, excluding −15, which is identical, may be considered as being similar.

In an example, there may be two 3×3 kernels, for simplicity, referred to as A and B and each having a single channel. For example, A may be the pivot kernel and B may be the non-pivot kernel. The kernels may be represented as:

$$A = \begin{matrix} 2 & 5 & 9 \\ 3 & 6 & 0 \\ 1 & 11 & 7 \end{matrix}$$

$$B = \begin{matrix} -2 & 6 & 11 \\ 3 & 9 & 8 \\ -1 & 10 & -9 \end{matrix}$$

The index stream of kernel A may be: 1, 1, 1, 1, 1, 0, 1, 1, 1. The index stream of kernel B may be: 1, 1, 1, 1, 1, 1, 1, 1, 1. The index stream may have a value of 0 if the weight is 0 and may have a value of 1, if the weight is a non-zero value. The value stream of A may be: 2, 5, 9, 3, 6, 1, 11, 7. The value stream of B may be: −2, 6, 11, 3, 9, 8, −1, 10, −9. The value stream may include the non-zero weights of the kernels.

The positions in the kernels A and B may be denoted as ordered pairs (i,j), where i is the row, and j is the column, where i∈[0-2] and j∈[0-2]. In such an example, the similarity criteria may be differences with respect to values of weights of ±1, ±2, and ±4, of magnitude. The processor 601 may compare the weights of the kernels, and may determine that weights of the kernels A and B at positions (0,1), (0,2), (2,1) and (2,2) may be similar. For example, the weights of the kernels A and B at positions (0,0), (1,0), and (2,0) may be identical. The processor 601 may, thereafter, modify kernel B so as to introduce sparsity. The modified kernel B may be:

$$B = \begin{matrix} 0 & 0 & 0 \\ 0 & 9 & 8 \\ 0 & 0 & 0 \end{matrix}$$

The index stream of modified kernel B may be: 0, 0, 0, 0, 1, 1, 0, 0, 0. The value stream of modified kernel B is: 9, 8. Thus, significant sparsity may be introduced into non-pivot kernels.

The processor 601 may also generate encoded S/I-IKW streams, based on the comparison of the weights of the pivot kernel, for example, kernel 0, with the weights of each of the non-pivot kernels, for example, kernels 1-15. The generation of the S/I-IKW stream may be similar to the generation of the I-IKW stream. The S/I-IKW stream may also be considered as an extension of the I-IKW stream. The number of generated S/I-IKW streams may be based on the number of non-pivot kernels, in that the S/I-IKW streams may be based on the comparison of the weights of the pivot kernel and the non-pivot kernels. If the kernels have a single channel, then the number of generated S/I-IKW streams may be equal to the number of kernels in the MAA that operate in parallel.

For example, if the kernels 0-15 each have a single channel, then 15 S/I-IKW streams may be generated. If the kernels each have two channels, then, two S/I-IKW streams may be generated for each kernel, and a total of 30 S/I-IKW streams may be generated.

The number of entries in an S/I-IKW stream may be based on the number of weights having non-zero values, in the pivot kernel. The S/I-IKW stream may not include an entry for weights with zero values in the pivot kernel, because a weight of the pivot kernel with zero value is not able to contribute to a reduction in a computational cost of the non-pivot kernel. If the values of weights in the same position and channel in the pivot kernel and non-pivot kernel are each one of equal in both magnitude and sign, equal in magnitude but with opposite sign, unequal, and similar, then an entry may be included in the S/I-IKW stream, indicating such a relationship between weights. Considering the above example of the pivot kernel A and the non-pivot kernel B, because there are eight weights are having non-zero values in the pivot kernel A, the number of entries in the S/I-IKW stream may be eight, accordingly.

The values of the entries of the S/I-IKW stream may be based on an encoding rule. In one or more embodiments, if the weights are unequal, then the value of the entry may be encoded as 0. If the weights are equal in magnitude and sign, then the value of the entry may be encoded as 2. If the weights are equal in magnitude, but opposite in sign, then the value of the entry may be encoded as 3.

If the weights are similar, that is, if the result obtained by subtracting weights of the non-pivot kernel from the weights of the pivot kernel is one of 1, −1, 2, −2, 4, and −4, then, in an one or more embodiments, the value of the entries of the S/I-IKW stream may be encoded as 4, 5, 6, 7, 8, and 9, respectively. For example, if the weight at a position (i, j) in the pivot kernel is 2 and the weight at the position (i, j) in the non-pivot kernel is 3, then the result of subtraction is −1. Thus, the encoded value in the S/I-IKW stream for the position (i, j) may be 5. In another example, if the weight at a position (i, j) in the pivot kernel is 6 and the weight at the position (i, j) in the non-pivot kernel is 5, then the result of subtraction is 1. Thus, the encoded value in the S/I-IKW stream for the position (i, j) may be 4.

If the weights are similar and the sign of the weights are opposite to one another, the sign may be initially ignored. The result obtained by subtracting weights of the non-pivot kernel from the weights of the pivot kernel may be determined, accordingly. In an one or more embodiments, based on the result, that is, one of, 1, −1, 2, −2, 4, and −4, the value of the entry of the S/I-IKW stream may be encoded as 10, 11, 12, 13, 14, and 15, accordingly. For example, if the weight at a position (i, j) in the pivot kernel is 2 and the weight at the position (i, j) in the non-pivot kernel is −3, then the negative sign of the weight of the non-pivot kernel may be ignored and the result of the relevant subtraction may be determined, which is −1. Accordingly, the encoded value in the S/I-IKW stream for the position (i, j) may be 11. In another example, if the weight at a position (i, j) in the pivot kernel is −6 and the weight at the position (i, j) in the non-pivot kernel is 5, then the negative sign of the weight of the pivot kernel may be ignored and the result of the relevant subtraction may be determined, which is 1. Thus, the encoded value in the S/I-IKW stream for the position (i, j) may be 10.

With respect to the above example of the pivot kernel A and the non-pivot kernel B, the values of the generated S/I-IKW stream may be 3 for (0,0), 5 for (0,1), 7 for (0,2), 2 for (1,0), 0 for (1,1), 3 for (2,0), 4 for (2,1), and 13 for (2,2). Therefore, the S/I-IKW stream for the example may be 3, 5, 7, 2, 0, 3, 4, 13. Because a value of the weight of the pivot kernel at (1,2) may be 0, the S/I-IKW stream does not include an entry for the position (1, 2). Thus, the number of entries may be equal to the number of weights in the pivot kernel having non-zero values.

In each MAU of the NPU 602, a convolution operation may be performed between pixels of an IFM and the weights of the kernel or modified kernel. The pivot kernel, for example, kernel 0, may perform the multiplication and accumulation operation for the non-zero weights. The S/I-IKW function 603 may choose whether to broadcast products of weights of the IFM and the weights of kernel 0 at a position (i, j) to the kernels 1-15, based on the entries at position (i, j) in the S/I-IKW streams that correspond to the channels in the kernels 1-15. If the value of an entry in the S/I-IKW stream is non-zero, then the products may be broadcast to the non-pivot kernels, in that the weights at position (i, j) in the pivot kernel and the non-pivot kernel are identical or similar and the weights at position (i, j) in the non-pivot kernel have been converted to 0.

If the weights at position (i, j) in the pivot kernel and the non-pivot kernels are identical or similar, then the S/I-IKW function 603 may determine values to be broadcast to the non-pivot kernels, such that the accumulated value at the output, that is the weight of the OFM, may be accurate. The S/I-IKW function 603 may determine the value (V) to be broadcast to a non-pivot kernel based on a product of the weight of the pivot kernel at position (i, j) and the pixel of the IFM (P), a value of the entry of the position (i, j) in the S/I-IKW stream, and the weight of the IFM (W). The value of the entry for position (i, j) in the S/I-IKW stream is based on the result of subtraction (R) of the weight in the non-pivot kernel from the weight in the pivot kernel at position (i, j). Therefore the value to be broadcast (V) is P−R*W.

With respect to the above example, the values of weights at position (1, 0) in the pivot kernel A and the non-pivot kernel B may be identical, corresponding to 3. Therefore R may be 0. The value of the entry for the position (1, 0) in S/I-IKW stream may be 2. The S/I-IKW function 603, based on the value of the entry in the S/I-IKW stream, may determine that the weights of the kernels A and B at the position (1, 0) are identical. Because the weights are identical, the product of the weight at the position (1, 0) in kernel A and an IFM weight and the product of the weight at the position (1, 0) in kernel B and the IFM weight will be the same. Therefore, the S/I-IKW function 603 may broadcast the product of the weight of the pivot kernel A in the position (1, 0) and the weight of the IFM to non-pivot kernel B, given that V=P, as R=0.

With respect to the above example, the values of the weights at the position (2, 1) of kernel A and B may be similar, namely 11 and 10. The result of subtraction R may be 1. The value of the entry for the position (2, 1) in the S/I-IKW stream may be 4. Based on the value of the entry, the S/I-IKW function 603 may determine that R may be 1. In an example, a weight W of the IFM at a particular position may be 6. When the weight at position (2, 1) of kernel A is multiplied with the weight of the IFM, the S/I-IKW network function 603 may retrieve the product P, which may be 11*6 or 66. The S/I-IKW network function 603 may compute a product of R, whose value may be 1, and W, whose value may be 6, which may be 1*6 or 6. Because V=P−R*W, the S/I-IKW network function 603 may determine that the value V to be broadcast is 66-6 or 60.

With respect to the above example, the values of the weights at the position (0, 2) of kernel A and B may be similar, namely 9 and 11. Therefore, R may be −2. The value of the entry for the position (0, 2) in the S/I-IKW stream may be 7. Based on such a value of the entry, the S/I-IKW function 603 may determine that R is −2. The weight of the IFM W may be considered to be 7. When the weight at position (0, 2) of kernel A is multiplied with W, the S/I-IKW network function 603 may retrieve P, which may be 9*7 or 63. The S/I-IKW network function 603 may compute a product of R, whose value may be −2, and W whose value may be 7, which may, −2*7 or −14. The S/I-IKW network function 603 may accordingly determine that a value of V to be broadcast is 63−(−14) or 77.

With respect to the above example of the pivot kernel A and the non-pivot kernel B, the modified non-pivot kernel B may not perform multiplication of weights at positions (0,0) (0,1), (0,2), (1,0), (2,0), (2,1) and (2,2) with the weights of the IFM, in that the values of the weights in these positions have been converted to 0. The pivot kernel A, based on the encoded S/I-IKW stream, may broadcast computed products of weights of the pivot kernel, in the positions (0,0), (0,1), (0,2), (1,0), (2,0), (2,1), and (2,2), and the weights in the IFM; to the non-pivot kernel B. The non-pivot kernel B may accumulate the broadcasted products along with the products of the weights of the non-pivot kernel B with non-zero values and the weights of the IFM, in order to determine the pixels of the OFM.

Thus, by using such techniques, the multiplication operations may be transformed to addition operations; which may thereby reduce the computational cost, latency, and power consumption of the non-pivot kernels, for example, kernels 1-15.

FIG. 6 shows example components of the system 600, accordingly to an non-limiting example, but it is to be understood that other embodiments are not limited to what is shown in the one or more embodiments of FIG. 6. In one or more other embodiments, the system 600 may include fewer or more components. Further, the labels or names of the components are used only for illustrative purpose and are not intended to limit the scope of the embodiments. One or more components may be combined together to perform the same or substantially similar functions in the system 600.

Figure 7:
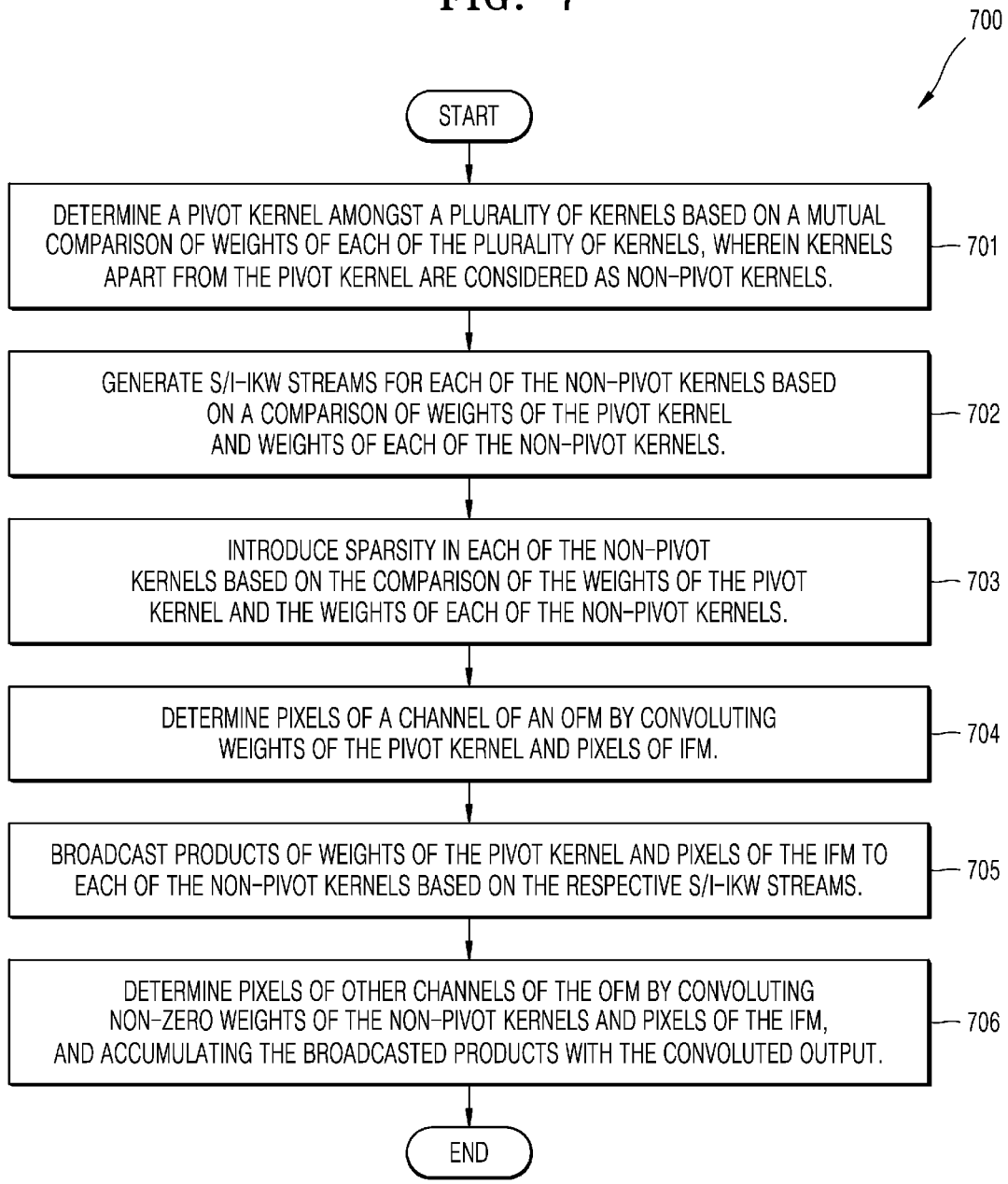
FIG. 7 is a flowchart depicting a method with performance optimization of a CNN by exploiting similar and/or identical weights across different kernels, according to one or more embodiments.

FIG. 7 is a flowchart 700 depicting a method for improving performance of a CNN by exploiting similar and/or identical weights across different kernels, according to one or more embodiments. At step 701, the method may include determining a pivot kernel amongst a plurality of kernels, based on a mutual comparison of weights of each of the plurality of kernels. The kernels excluding the pivot kernel may be considered as being non-pivot kernels. The number of weights in each channel and the number of channels for each of the plurality of kernels are the same in order to successfully perform the mutual comparison. A first weight located in a position in a channel of a first kernel may be compared with a second weight in a second kernel, if the second weight is located in the same position and same channel of the second kernel.

In a non-limiting example, there may be 3 kernels in a kernel set, each having dimensions 3, 3, 1. As each of the kernels in this example has a single channel, all weights in each of the three kernels may be located in the same channel. For example, each kernel may have 9 weights, located in 9 positions. In order to compare a weight of a kernel with another weight in another kernel, it may be ensured that the positions of the weights are same. For example, a weight in kernel 0 located at a position (0,0) may be compared with weights of kernels 1 and 2 that are also located at the corresponding position (0,0).

The one or more embodiments may include computing a score of comparison for kernels 0, 1, and 2. The score of kernel 0 may be determined by accumulating a number of weights of kernel 0 that are identical with or similar to the weights of kernel 1, and a number of weights of kernel 0 that are identical with or similar to the weights of kernel 2. The score of kernel 1 may be determined by accumulating the number of weights of kernel 1 that are identical with or similar to the weights of kernel 0 and a number of weights of kernel 1 that are identical with or similar to the weights of kernel 2. The score of kernel 2 may be determined by accumulating the number of weights of kernel 2 that are identical with or similar to the weights of kernel 0 and the number of weights of kernel 2 that are identical with or similar to the weights of kernel 1. Accordingly, the kernel with the highest score of comparison may be considered as being the pivot kernel. The remaining kernels may be considered as being non-pivot kernels. In an example, kernel 0 may be the pivot kernel and the kernels 1 and 2 may be non-pivot kernels.

At step 702, the method may include generating S/I-IKW streams associated with each of the non-pivot kernels, based on the comparison of weights of the pivot kernel and weights of each of the non-pivot kernels. The one or more embodiments may include utilizing the comparison of the weights of kernel 0 with the weights of kernel 1 and kernel 2 in order to generate encoded S/I-IKW streams. A first encoded S/I-IKW stream may be generated based on the comparison of weights of the pivot kernel 0 and the non-pivot kernel 1 and a second encoded S/I-IKW stream may be generated based on the comparison of weights of the pivot kernel 0 and the non-pivot kernel 2.

The values of the S/I-IKW streams may be based on an encoding rule. In an one or more embodiments, if the weights in the kernels are not equal, then the encoded value may be 0. In an one or more embodiments, if the weights are identical in magnitude and sign, then the encoded value may be 1. In one or more embodiments, if the weights are identical in magnitude and opposite in sign, then the encoded value may be 2. The one or more embodiments may also configure similarity criteria, wherein if a difference in weights follows the similarity criteria, then the weights may be considered as similar and an entry may be created in the S/I-IKW stream with an appropriate encoded value.

For example, the similarity criteria may be ±2. If the result of subtraction of a weight of a non-pivot kernel from the weight of a pivot kernel, where weights are in the same position and channel in both kernels, is within a range of ±2, then the weights may be considered as being similar. If the value of a weight is 7, then weights having values 5, 6, 8, and 9 may be considered as being similar.

In one or more embodiments, if the signs of the weights are opposite and the result of subtraction, ignoring the sign is within the range of ±2, then those weights may also be considered as being similar. Thus, if the value of the weight is 7, then the weights −5, −6, −8, and −9 may also be considered as being similar. In a non-limiting example, the value of a weight in a location in the pivot kernel may be 7. Table 1 depicts example encoded values for such an example in the S/I-IKW streams for identical and similar weights in the corresponding non-pivot kernels:

TABLE 1

| Value of weight in the non-pivot kernel | Encoded value in S/I-IKW stream | Value of weight in the non-pivot kernel | Encoded value in S/I-IKW stream |
|---|---|---|---|
| 5 (Similar) | 5 | −5 (Similar) | 9 |
| 6 (Similar) | 3 | −6 (Similar) | 7 |
| 7 (Identical) | 1 | −7 (Identical) | 2 |
| 8 (Similar) | 4 | −8 (Similar) | 8 |
| 9 (Similar) | 6 | −9 (Similar) | 10 |

It may be noted that if the weights do not match, then the encoded value in S/I-IKW stream may be 0.

At step 703, the method may include introducing sparsity into each of the non-pivot kernels, based on the comparison of the weights of the pivot kernel and the weights of each of the non-pivot kernels. The weights of the non-pivot kernels 0 and 1 that are similar or identical to the weights of the pivot kernel may be converted to zero. Thus, sparsity may be introduced into the non-pivot kernels. In an example, if four, out of nine, weights of kernel 0 and kernel 1 are identical or similar, then the values of the four weights in kernel 1 may be converted into zero. Similarly, if three, out of nine, weights of kernel 0 and kernel 2 are identical or similar, then the values of the three weights in kernel 2 may be converted into zero.

At step 704, the method may include determining pixels of a channel of an OFM by convoluting weights of the pivot kernel and pixels of an IFM. The convolution operation may involve sliding the weights of the kernel over the pixels of the IFM. At a particular sliding position, the products of the pixels of the IFM and weights of the kernel may be computed accordingly. The pixels of the IFM and the weights of the kernel that are multiplied for obtaining the products are located at the same channel in the IFM and the kernel, respectively. The products may be accumulated in order to determine the pixel of the OFM at a particular position.

At step 705, the method may include broadcasting products of weights of the pivot kernel and pixels of the IFM to each of the non-pivot kernels, based on the respective S/I-IKW streams. In an example, the values of weights at position (2, 2) in kernel 0 and kernel 2 may be identical. Therefore, the product of the weight at the position (2, 2) in kernel 0 and the IFM pixels, and the product of the weight at the position (2, 2) in kernel 2 and the IFM pixels, may be the same. As kernel 2 may be a non-pivot kernel, the value of the weight at the position (2, 2) may be converted to 0. The S/I-IKW stream associated with kernel 2, based on the comparison of the weights of kernel 0 and kernel 2, may include an entry to indicate either the broadcast network 303 or the S/I-IKW function 603 used to broadcast the product. Accordingly, the MAU including the kernel 2 may not compute a product of the weight of the kernel 2 at position (2, 2) with the pixel of the IFM.

If the values of weights at position (2, 2) in kernel 0 and kernel 2 are similar, the value of the weight at the position (2, 2) of kernel 2 may be converted to 0. The S/I-IKW stream associated with kernel 2 may include an entry, which may be interpreted by the S/I-IKW network function 603 for determining a value to be broadcast to kernel 2 such that the value may be equal to the actual product of the weight of the IFM and the weight at position (2, 2) of kernel 2.

In an example, the value of the weight at the position (2, 2) of kernel 0 may be 8 and the value of the weight at the position (2, 2) of kernel 0 may be 9. In such an example, a value of a pixel of the IFM at a particular position may be 10. When the weight at position (2, 2) of kernel 0 is slid over the weight of the IFM, the S/I-IKW network function 603 may retrieve the product, for example, 8*10 or 80 of the weight at position (2, 2) of kernel 0 and pixel of the IFM, from the output of the multiplier. The S/I-IKW network function 603 may determine the result of subtraction of the weight at position (2, 2) of kernel 0 from the weight at the position (2, 2) of kernel 0, for example, 8-9, based on the entry on the S-IKW stream associated with kernel 2 at position (2, 2). The S/I-IKW network function 603 may then compute a product of the result of such a subtraction, for example, −1, and the pixel of the IFM, for example, 10.

The S/I-IKW network function 603 may determine the value to be broadcast based on the computation, for example, 80−(−1)*10. Such a value, for example, 90, may subsequently be broadcast to the accumulator of the MAU, including kernel 2. The MAU including kernel 2 may not compute a product of the weight of the kernel 2 at position (2, 2) with the pixels of the IFM, as the value of the weight (2, 2) may be converted to 0. Therefore, if weights in the pivot kernel are identical with or similar to the weights of the non-pivot kernels, sparsity may be introduced into the non-pivot kernels. Such an introduction of sparsity may reduce a computational cost and a processing load for the non-pivot kernels, as the non-pivot kernels may not compute the products.

At step 706, the method may include determining weights of other channels of the OFM by convoluting non-zero weights of the non-pivot kernels and pixels of the IFM, and accumulating the broadcasted products with the convoluted output. One or more embodiments may include accumulating the products broadcasted by the broadcast network 303 or the S/I-IKW function 603 with the convoluted output, in order to compensate for the sparsity in the non-pivot kernels.

The various actions in the flowchart 700 may be performed in the order presented, in a different order, or simultaneously. Further, in one or more embodiments, some of the actions listed in FIG. 7 may be omitted.

Figure 8:
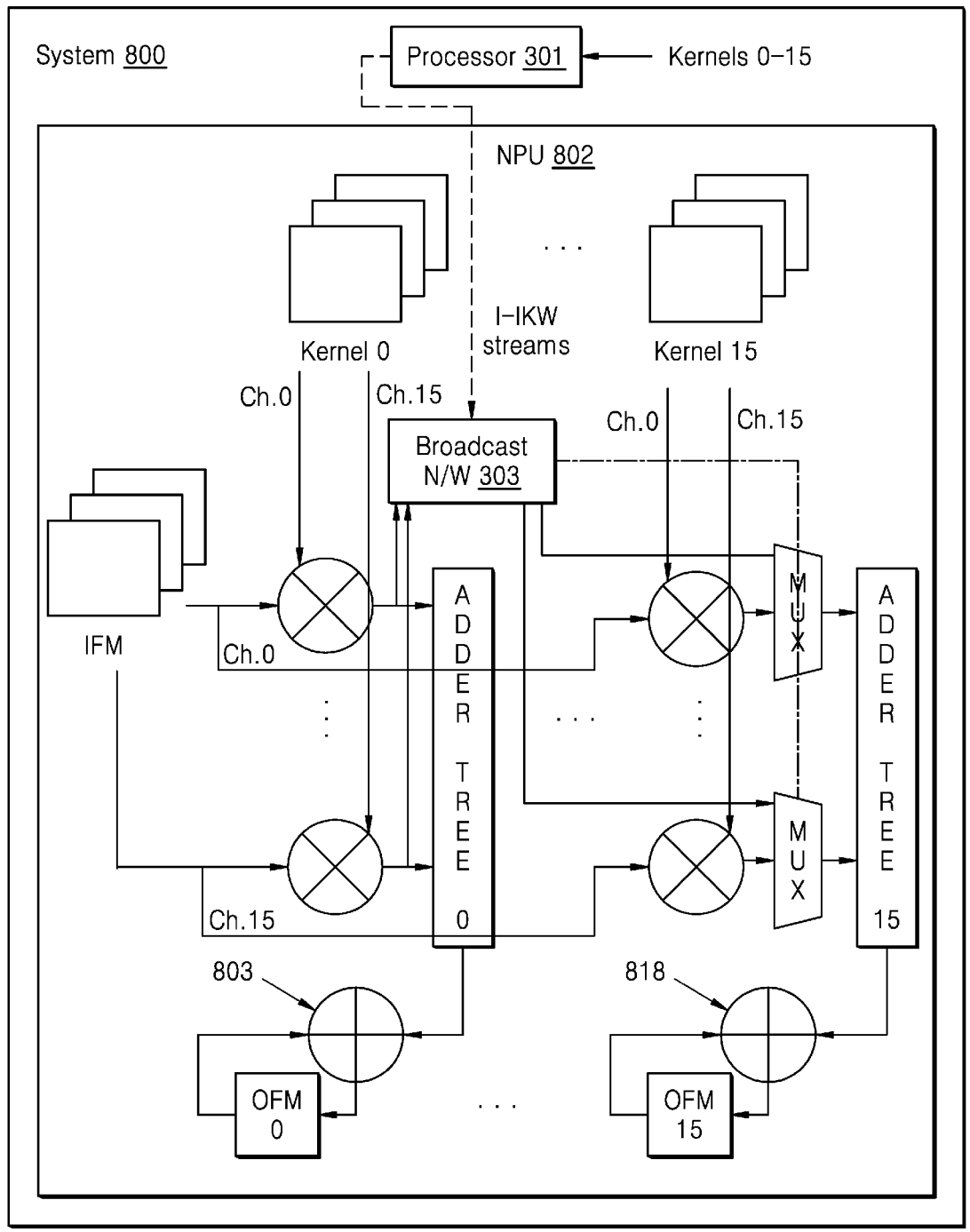
FIG. 8 depicts a system comprising of a NPU with performance optimization of the CNN by exploiting identical weights in different kernels, according to one or more embodiments.

FIG. 8 depicts a system 800 comprising of a NPU-1 802 for optimizing performance of the CNN by exploiting identical weights in different kernels, according to one or more embodiments. The architecture of the NPU 802 may be of type 1. The NPU 802 type 1 may not use kernel zero-skipping. As a result, all kernels may operate in lock-step. The NPU 802 type 1 may use IFM zero-skipping, and may have IFM pixels stored in a depth-first, or z-direction first, format. For example, an index stream of a 2×2 kernel A may be 1, 0, 0, 1 and a value stream of kernel A may be 3, 4. For NPU architecture type 0, the multiplication operation may be completed in two cycles, but for NPU architecture type 1, the multiplication operation may be completed in four cycles, including multiplication of weights of the kernels and the IFM pixels. Because the kernels operate in lock-step, products of weights of IFM and the pivot kernel may be used by non-pivot kernels.

The IFM pixels may be broadcast to all the kernels, that is, in the example of FIG. 8, kernel 0-kernel 15. The processor 301 may generate I-IKW streams based on the comparisons of weights of the pivot kernel and each of the non-pivot kernels. In such an example, kernel 0 may be the pivot kernel and the kernels 1-15 may be the non-pivot kernels. The products of the IFM pixels and weights of the pivot kernel may be broadcast by the broadcast network 303, based on the generated I-IKW streams.

As depicted in the example of FIG. 8, each of the kernels, both pivot and non-pivot may include 16 channels each. The kernels may be, therefore, convoluted with IFMs comprising of 16 channels. For illustration, 16 kernels are depicted. As there may be 16 kernels in such a non-limiting example, 16 channels of OFM may be generated. The NPU 802 may include an adder tree instead of using individual accumulators. Each adder tree may accumulate the products of weights and pixels of all channels of the kernel and the IFM. Because there are 16 kernels, the NPU 802 may include 16 adder trees, for example, adder trees 0-15, which may contribute to the generation of the corresponding 16 OFM channels.

The method of determination of the pivot kernel may be identical to that used in NPU architecture type 0. Sparsity may be introduced into the non-pivot kernels based on the comparison of weights of the pivot and non-pivot kernels. The processor 801 may introduce sparsity into the non-pivot kernels in order to improve the performance of one or more examples, such as by reducing computational cost, processing load, and power consumption of the NPU 800.

The NPU 802 may include multiplexers that may multiplex products of the weights of the pivot kernel and the IFM pixels, and may multiplex products of the weights of the non-pivot kernels and the IFM pixels. The products of the weights of the pivot kernel and the IFM pixels of all channels in a single column may be provided to the adder tree 0. The products of the weights of the pivot kernel and the IFM may be provided to the broadcast network 303. For non-pivot kernels 1-15, the products of pixels of the IFM and weights of each of the non-pivot kernels may be multiplexed with the products of the weights of the pivot kernel and the pixels of the IFM. The output of the multiplexer may be provided to the adder trees 1-15. Each adder tree may accumulate the products across 16 channels in a column.

As the kernels operate in lock-step, in a given cycle, if weight of a non-pivot kernel at a particular position is zero, that is, converted to 0 to introduce sparsity, and marked as an I-IKW entry in an I-IKW stream, then a multiplier used when multiplying weights of a non-pivot kernel and pixels of the IFM may be turned off. The broadcast network 303 may fetch a product of a weight of a pivot kernel, such as a corresponding weight at the same position, and an IFM pixel. The fetched product may be broadcast by the broadcast network 303 to the multiplier. The select lines of the multiplexers may be driven by the broadcast network 303 in order to select the broadcasted product, which may be fed to an adder tree. Because kernels may operate in lock-step, the NPU 802 with type 1 architecture may use multiplexers in non-pivot kernels in order to use the product broadcasted from pivot kernel, which may save area and power.

The adder trees may accumulate the products of the weights of the kernels and the IFM pixels of all channels of the kernels and the IFM. The adder trees may provide the accumulated outputs to the external accumulators 803-818. The external accumulators 803-818 may accumulate the accumulated outputs provided by the corresponding adder trees and the values accumulated during the previous cycle, so as to generate OFM pixels. The external accumulators 803-818 may be split using a bit-wise split technique as shown in greater detail in the one or more embodiments of FIG. 4A, which may result in a further power saving.

Figure 9:
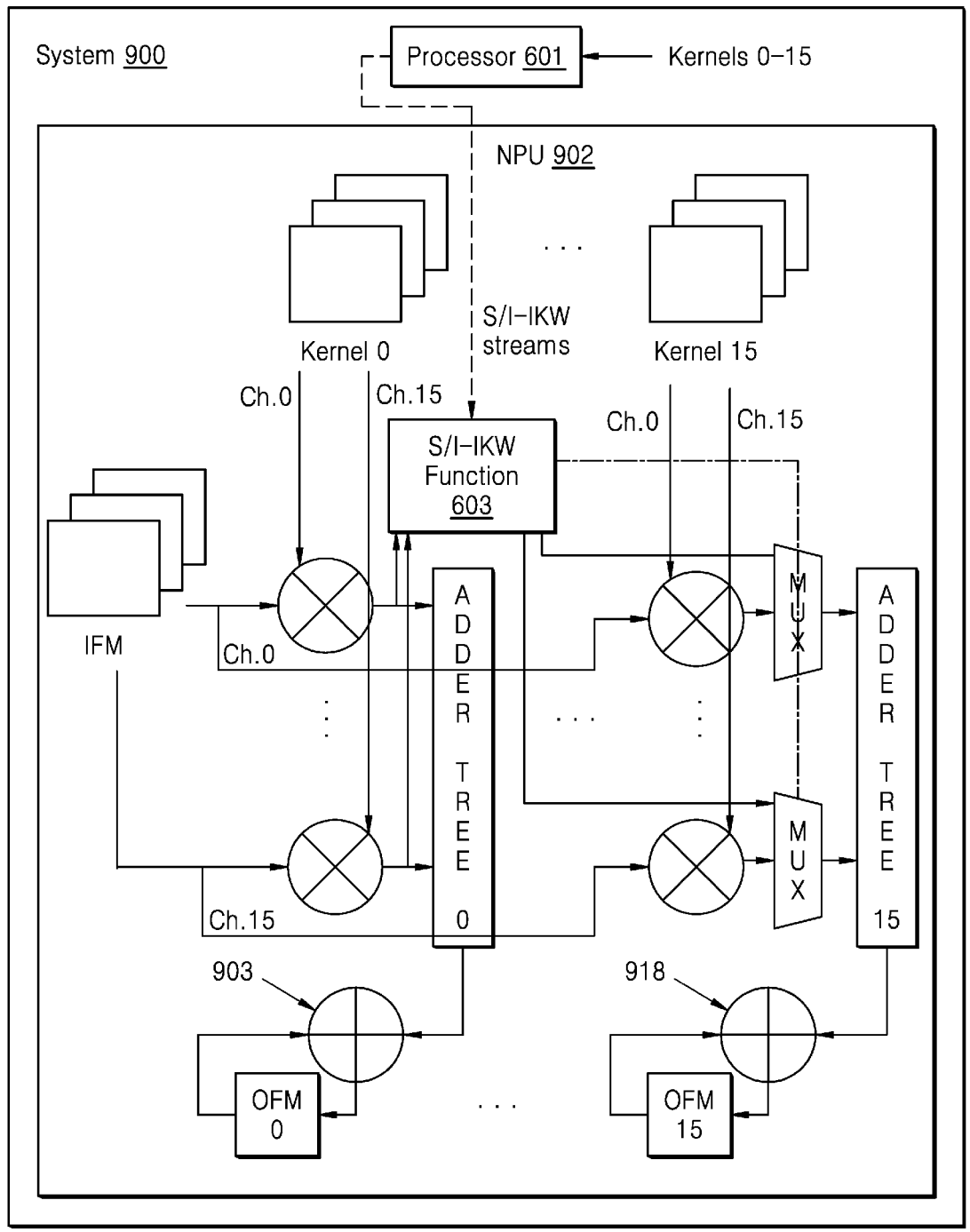
FIG. 9 depicts a system comprising of a NPU with performance optimization of the CNN by exploiting similar/identical weights in different kernels, according to one or more embodiments.

FIG. 9 depicts a system 900 including a NPU-1 902 for optimizing performance of the CNN by exploiting similar or identical weights in different kernels, according to one or more embodiments. As depicted in the one or more embodiments of FIG. 9, the system 900 may include of a processor 601, and the NPU 902, as a non-limiting example. For illustrative purposes only, in such an example, 16 kernels are depicted. The architecture of the NPU 902 may be of type 1. All kernels operating in the system 900 may operate in lock-step.

The processor 901 may compare the weights of each kernel with weights of the other 15 kernels, in order to detect whether the weights are similar or identical to each other. The processor 601 may consider a kernel with the highest score, as discussed in greater detail with respect to the one or more embodiments of FIG. 3, as being the pivot kernel and may consider the rest of the other kernels as being non-pivot kernels. In the one or more embodiments of FIG. 9, kernel 0 may be the pivot kernel and kernels 1-15 may be the non-pivot kernels. As depicted in the one or more embodiments of FIG. 9, each of the kernels may include 16 channels. Thus, the weights of the channel kernels may be convoluted with the IFM pixels of the corresponding channels. As the system 900 may include 16 kernels, 16 OFM channels, namely, OFM 0-15, may be generated. The system 900 may include 16 adder trees, each contributing to the generation of an OFM channel in a single column. For example, kernel 0 may be the pivot kernel and the kernels 1-15 may be the non-pivot kernels. Sparsity may be introduced into the non-pivot kernels based on the comparison of weights of the pivot and non-pivot kernels, as discussed in greater detail with respect to the one or more embodiments of FIG. 6, based on the similarity criterion.

The multiplexers in the NPU 902 may multiplex products of the weights of the pivot kernels and the IFM pixels, where the products may be fetched by using the S/I-IKW function 903, and products of the weights of the non-pivot kernels and the IFM pixels. The products fetched by the S/I-IKW function 903 may be either modified or fed to the multiplexers. If the products are modified, the modification may be based on the pixels of the IFM, comparison of the weights of the pivot kernel, and the weights of the non-pivot kernels at the same position such as in the S/I-IKW stream, and also products of the weights of the pivot kernel and the IFM pixels. The NPU 902 may ascertain whether the weights of the pivot kernel and the non-pivot kernels at the same position and channel are either similar or identical, based on the associated S/IKW streams. The operation of how the S/I-IKW function 903 and the generation of that may be provided to the multiplexers values, in case the fetched products are modified, are discussed in greater detail in the one or more embodiments of FIG. 6. If the weights are similar, the S/I-IKW function 603 may modify the product of the weights of the pivot kernel and the weights of the IFM accordingly. If the weights are identical, the S/I-IKW function 603 may not modify the product of the weights of the pivot kernel and the pixels of the IFM. The modifications are performed based on the principles (V=P–R*W) discussed in greater detail with respect to the one or more embodiments of FIG. 6.

The products of the weights of the pivot kernel and the IFM pixels of all channels in a single column may be provided to the adder tree 0. The products of the weights of the pivot kernel and the IFM may also be provided to the S/I-IKW function 603. For non-pivot kernels 1-15, the products of pixels of the IFM and weights of each of the non-pivot kernels may be multiplexed with the products of the weights of the pivot kernel and the IFM pixels, and the output of the multiplexer may be provided to the adder trees 1-15. Each adder tree may accumulate the products across 16 channels of each kernel in a column, in order to generate the corresponding OFM pixels.

Because kernels may operate in lock-step, in a given cycle, if weight of a non-pivot kernel at a particular position is zero, such as by being converted to 0 to introduce sparsity, and is marked as an S/I-IKW entry in an S/I-IKW stream, then a multiplier, such as a multiplier used for multiplying weights of a non-pivot kernel and pixels of the IFM, may be turned off. The S/I-IKW function 603 may fetch a product of a weight of a pivot kernel, at the same position, and an IFM pixel. The fetched product may be broadcast by the S/I-IKW function 603 to the multiplier. The select lines of the multiplexers may be driven by the S/I-IKW function 603 to select the broadcasted product.

The adder trees may accumulate the products of the weights of the kernels and the IFM pixels and may provide the outputs to the external accumulators, namely, 903-918. The external accumulators NPU 903-918 may accumulate the outputs provided by the adder trees and the values accumulated during the previous cycle to generate OFM pixels. The external accumulators NPU 903-918 may be split using bitwise split formulation techniques as shown in greater detail in the one or more embodiments of FIG. 4A, which may results in power savings.

Figure 10:
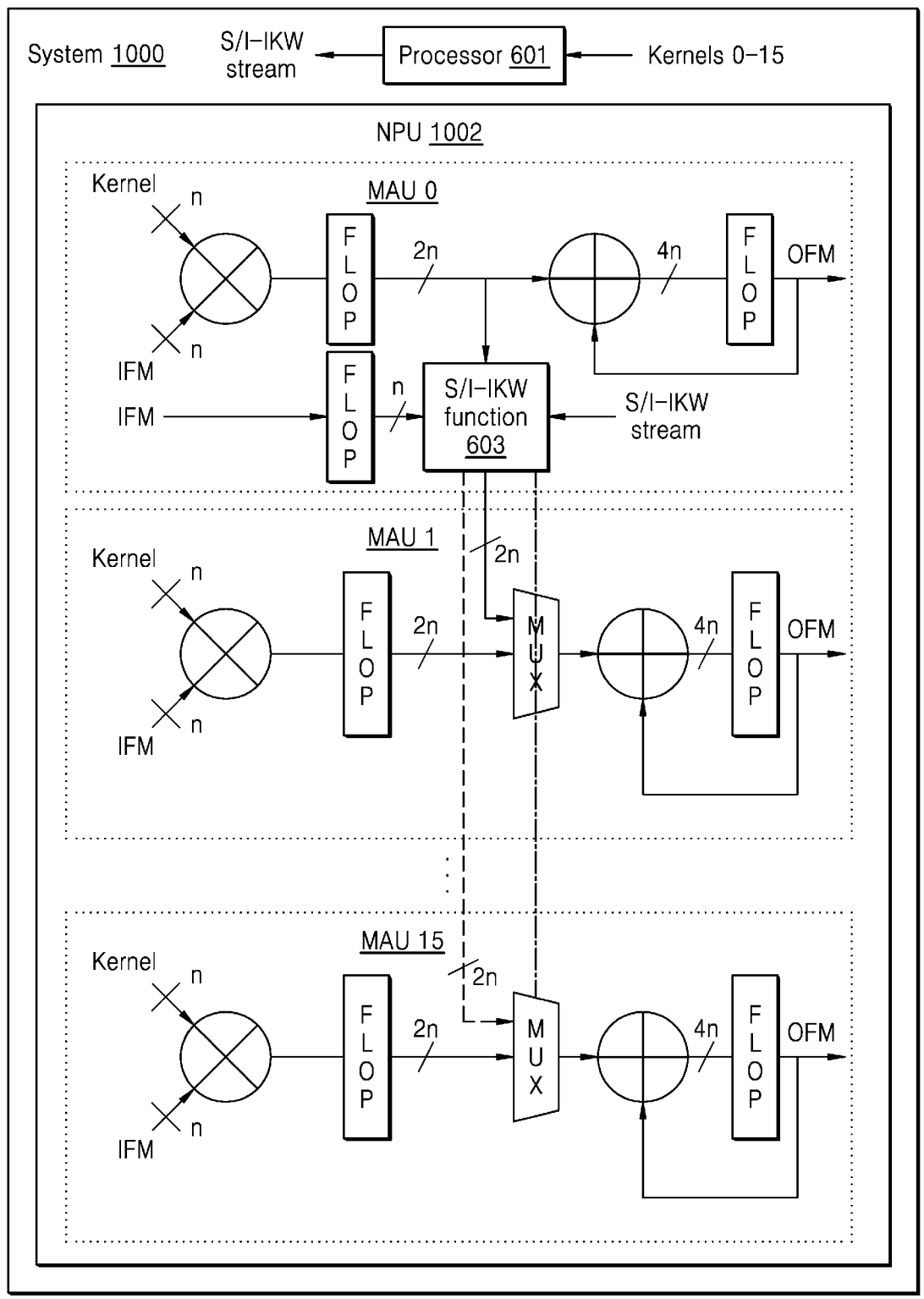
FIG. 10 depicts a system with performance optimization of a CNN by exploiting similar/identical weights in different kernels, according to one or more embodiments.

FIG. 10 depicts a system 1000 configured to optimize performance of the CNN by exploiting similar or identical weights in different kernels, according to one or more embodiments. As depicted in the one or more embodiments of FIG. 10, the system 1000 may include the processor 601 and a NPU 1002. In the one or more embodiments of FIG. 10, the architecture of the NPU 1002 may be of type 0.

For example, the functionality of the processor 601 in the systems 600 and 1000 may be identical. The functionality of the S/I-IKW function 603 in the systems 600 and 1000 may be identical.

The non-pivot kernels may include multiplexers, which may multiplex products of weights of the non-pivot kernels and pixels of the IFM, and may broadcast products of weights of the pivot kernel and pixels of the IFM. If sparsity is introduced due to similarity of weights of the pivot kernel and the non-pivot kernels, the products to be broadcast may be modified based on the S/I-IKW streams, and the products of weights of the pivot kernel and the pixels of the IFM.

The pivot kernel and the non-pivot kernels in the MAUs may operate in lock-step. If the products of weights the non-pivot kernels and the IFM pixels are 0, outputs of the multiplexers may be the broadcasted values or may be modified broadcasted values. The values of the OFM pixels may be obtained through the accumulators by accumulating the outputs of the multiplexers and the previously accumulated OFM pixel values.

FIG. 10 shows example components of the system 1000 according to one non-limiting example, but it is to be understood that other embodiments are not limited to the particular features of the one or more embodiments of FIG. 10. In other embodiments, the system 1000 may include fewer or more components. Further, the labels or names of the components are used only for illustrative purposes and are not to be interpreted to limit the scope of the present disclosure. Also, one or more components may be combined together to perform the same or substantially similar functions in the system 1000.

Figure 11:
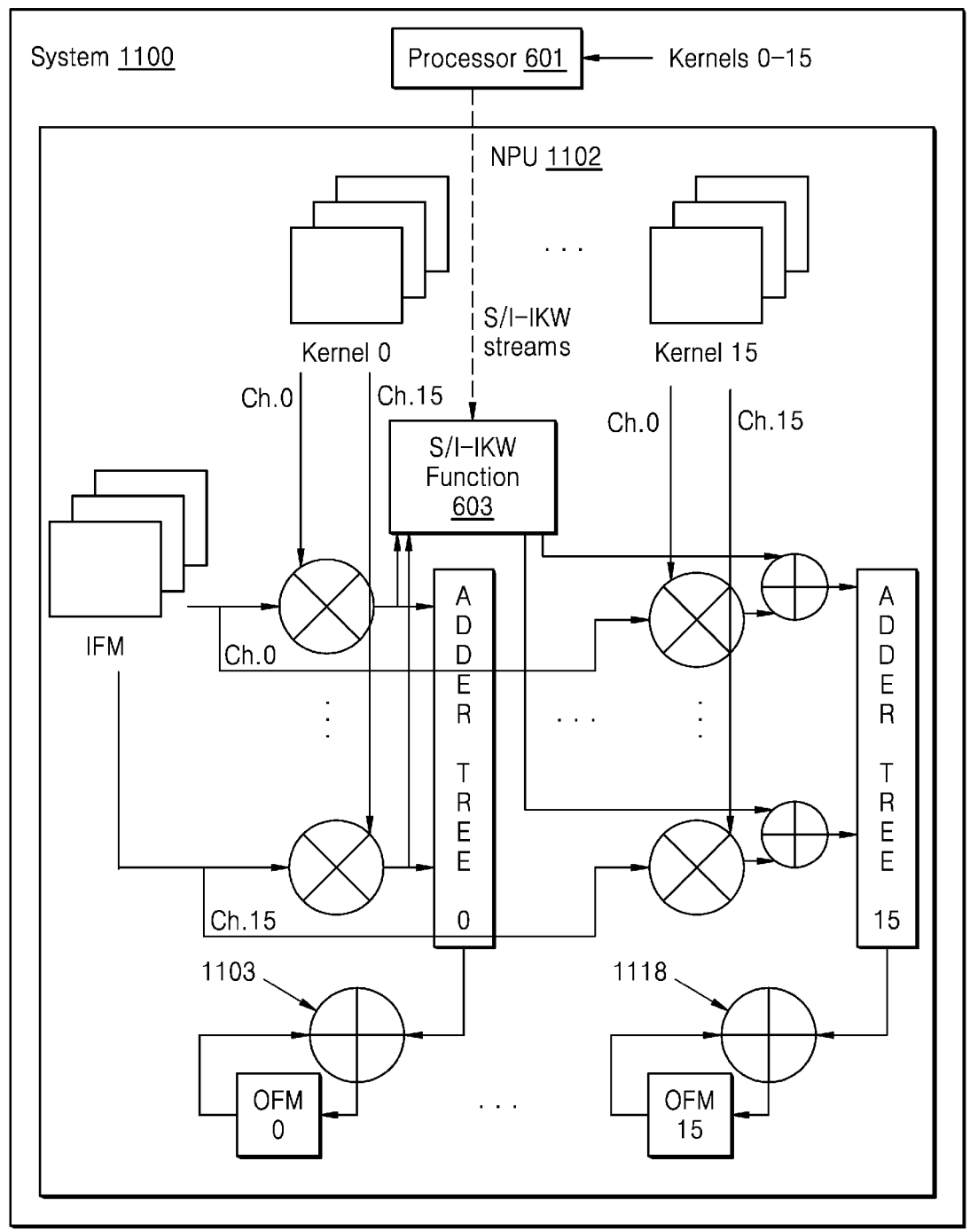
FIG. 11 depicts a system with performance optimization of a CNN by exploiting similar/identical weights in different kernels, according to one or more embodiments.

FIG. 11 depicts a system 1100 configured to optimize performance of the CNN by exploiting similar or identical weights in different kernels, according to one or more embodiments. As depicted in the one or more embodiments of FIG. 11, the system 1100 may include the processor 601 and a NPU 1102. The architecture of the NPU 1102 may be of type 1.

The functionality of the processor 601 in the systems 600 and 1100 may be identical. Likewise, the functionality of the S/I-IKW function 603 in the systems 600 and 1100 is identical.

The non-pivot kernels may include adders if the different non-pivot kernels and the pivot kernel operate at different speeds. The adders may perform a summation of the products of weights of the non-pivot kernels and pixels of the IFM and broadcasted products of weights of the pivot kernel and pixels of the IFM. It may be noted that the S/I-IKW function 603 may broadcast products of weights of the pivot kernel and pixels of the IFM only if the products of weights of the non-pivot kernels and pixels of the IFM is zero, which may be determined from the S/I-IKW streams. The weights of the non-pivot kernels and pixels of the IFM may be zero if the weights of the non-pivot kernel are originally 0, if the pixel values of the IFM are zero, and if sparsity is introduced into the non-pivot kernels.

If sparsity is introduced due to similarity of weights of the pivot kernel and the non-pivot kernels, the products to be broadcast may be modified based on the S/I-IKW streams and the products of weights of the pivot kernel and the pixels of the IFM. The outputs of each of the adders in the non-pivot kernels may be provided to the respective adder trees, which may contribute to the generation of the OFM pixels.

FIG. 11 shows example components of the system 1100 according to a non-limiting example, but it is to be understood that other embodiments are not limited to the one or more embodiments of FIG. 11. In other examples, the system 1100 may include fewer or more components. Further, the labels or names of the components are used only for illustrative purpose and are not intended to limit the scope of the present disclosure. Also, one or more components may be combined together to perform the same or substantially similar functions in the system 1100.

Figure 12A:
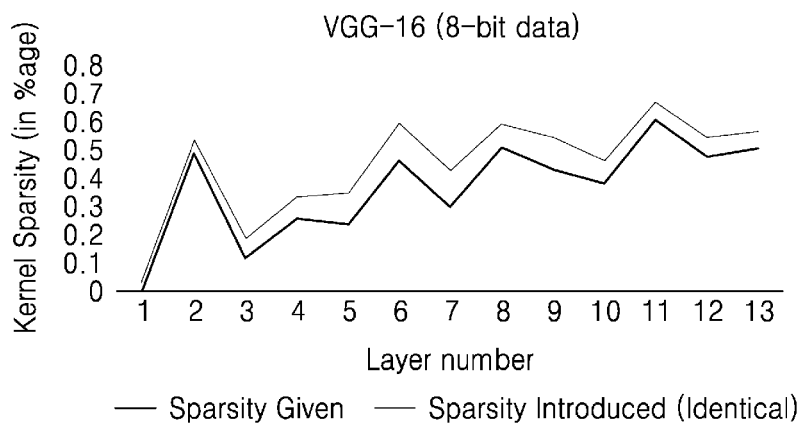
FIGS. 12A and 12B are graphs depicting sparsity introduced in non-pivot kernels based on comparison of weights of pivot kernel and non-pivot kernels of a Visual Geometry Group (VGG) CNN, according to one or more embodiments.
Figure 12B:
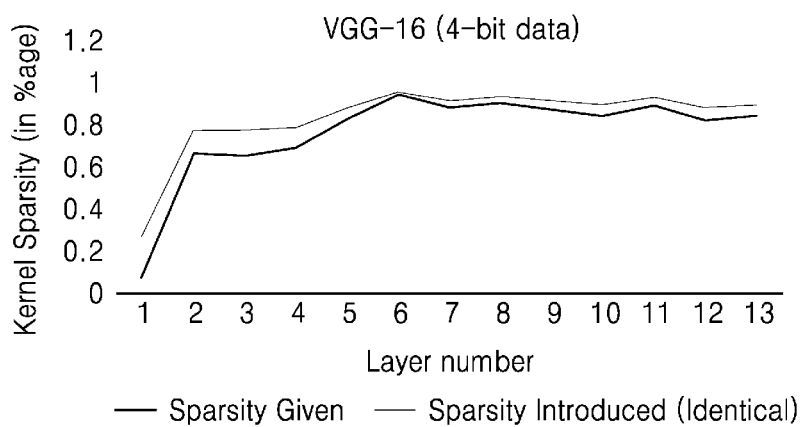

FIGS. 12A and 12B are graphs illustrating sparsity introduced into non-pivot kernels based on comparisons of weights of a pivot kernel and non-pivot kernels of a Visual Geometry Group (VGG) CNN, according to one or more embodiments. For example, the VGG may include 16 layers. The weights of the kernels of the VGG-16, depicted in the one or more embodiments of FIG. 12A, may include 8 bits. The weights of the kernels of the VGG-16, depicted in the one or more embodiments of FIG. 12B, may include 4 bits. The weights of the pivot kernel and the non-pivot kernels may be compared to identify identical weights. The values of the identified weights in the non-pivot kernels may be converted to zero, to introduce sparsity. For both 8-bit and 4-bit weights, the sparsity may increase by 8%, after converting the identical weights to 0.

Figure 13A:
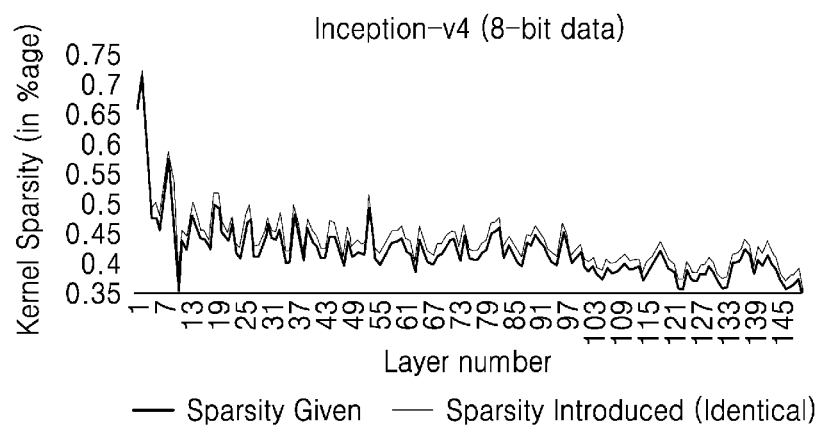
FIGS. 13A and 13B are graphs depicting sparsity introduced in non-pivot kernels based on comparison of weights of pivot kernel and non-pivot kernels of an inception-version 4 CNN, according to one or more embodiments.
Figure 13B:
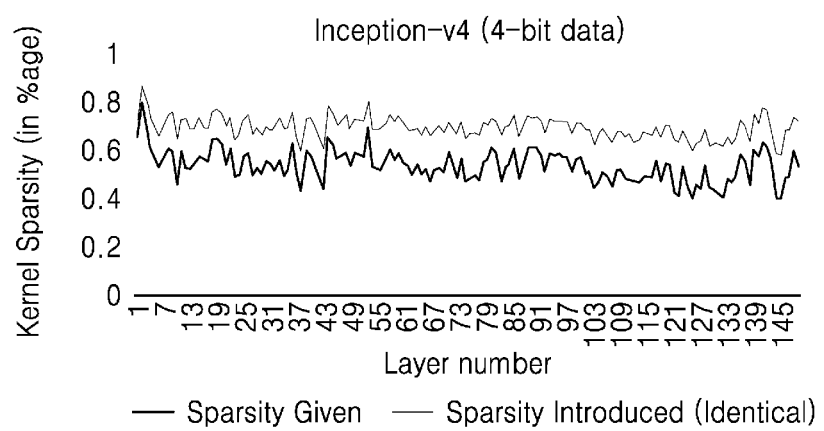

FIGS. 13A and 13B are graphs depicting sparsity introduced in non-pivot kernels, based on comparisons of weights of pivot kernel and non-pivot kernels of an inception-version 4 CNN, according to one or more embodiments. The weights of the kernels of the inception-version 4 CNN, as depicted in the one or more embodiments of FIG. 13A, may include 8 bits. The sparsity may increase by 2% after converting the identical weights to 0. The weights of the kernels of the inception-version 4 CNN, depicted in the one or more embodiments of FIG. 13B, may include 4 bits. The sparsity may increase by 3% after converting the identical weights to 0.

Figure 14A:
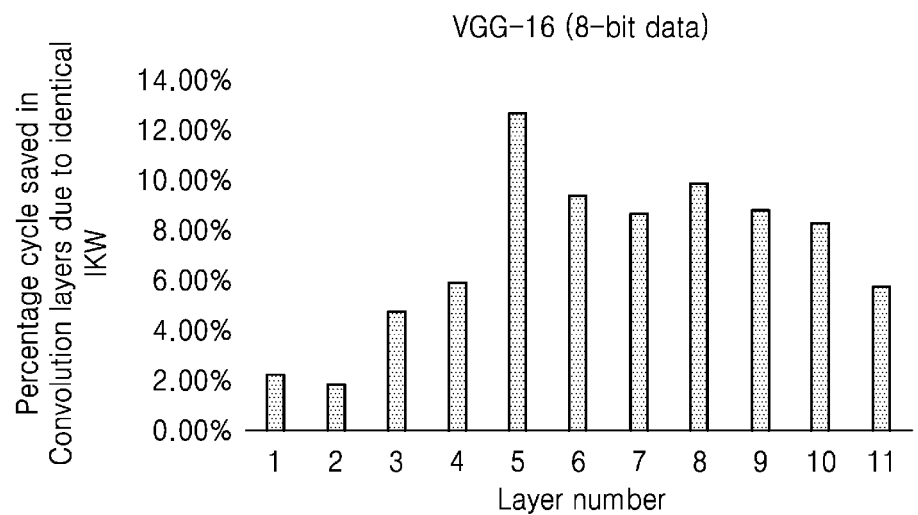
FIGS. 14A and 14B are graphs depicting performance improvement of a VGG-16 CNN, according to one or more embodiments.
Figure 14B:
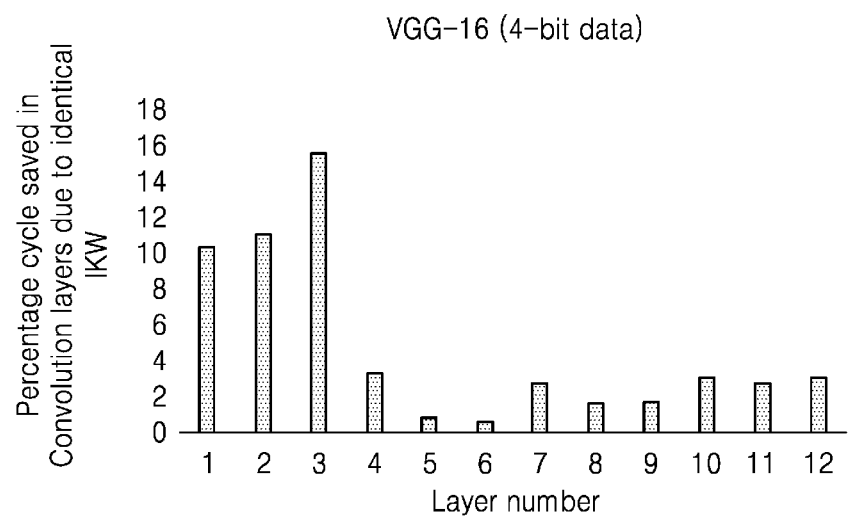

FIGS. 14A and 14B are graphs depicting performance improvement of the VGG-16 CNN, according to one or more embodiments. Because the identical weights of the non-pivot kernels may be converted to 0 and products of weights of the pivot kernel and the IFM may be broadcast to the non-pivot kernels, the computations of products of the IFM and the weights of the non-pivot kernels, which may be identical with the weights of the pivot kernels, may not be performed. The broadcasted products may be accumulated with the products of the non-zero weights and the IFM. Thus, multiplication operations may be converted to accumulation operations. Such an approach may reduce the computational complexity and may improve the performance of the CNN.

The weights of the kernels of the VGG-16 CNN, depicted in the one or more embodiments of FIG. 14A, may include 8 bits. The performance of the VGG-16 CNN may improve by 7.15%. The weights of the kernels of the VGG-16 CNN, depicted in the one or more embodiments of FIG. 14B, may include 4 bits. The performance of the VGG-16 CNN may improve by 4.7%.

Figure 15A:
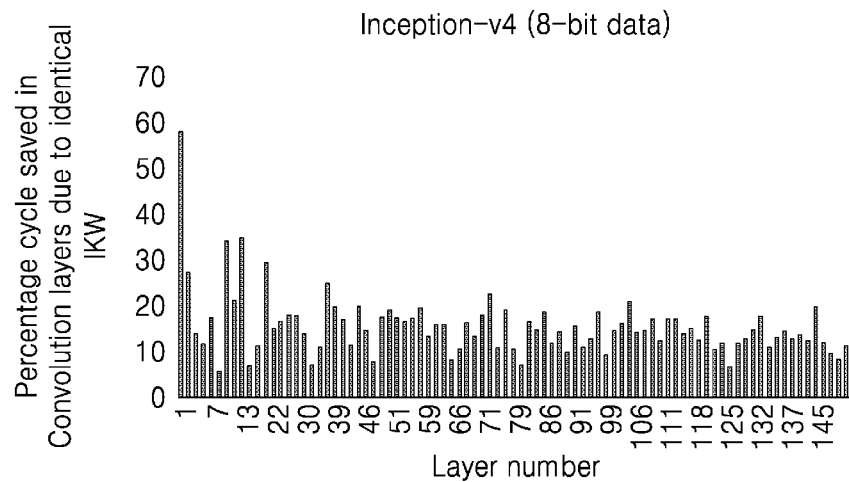
FIGS. 15A and 15B are graphs depicting performance improvement of an inception-version 4 CNN, according to one or more embodiments.
Figure 15B:
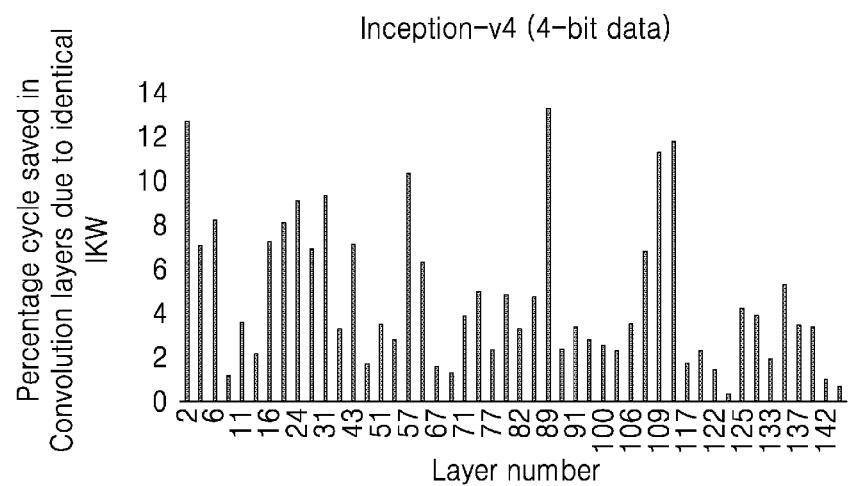

FIGS. 15A and 15B are graphs depicting performance improvement of the inception-version 4 CNN, according to one or more embodiments. The weights of the kernels of the inception-version 4 CNN, depicted in the one or more embodiments of FIG. 15A, may include 8 bits. The performance of the inception-version 4 CNN may improve by 1.56%. The weights of the kernels of the inception-version 4 CNN, depicted in the one or more embodiments of FIG. 15B, may include 4 bits. The performance of the inception-version 4 CNN may improve by 4.7%.

Figure 16A:
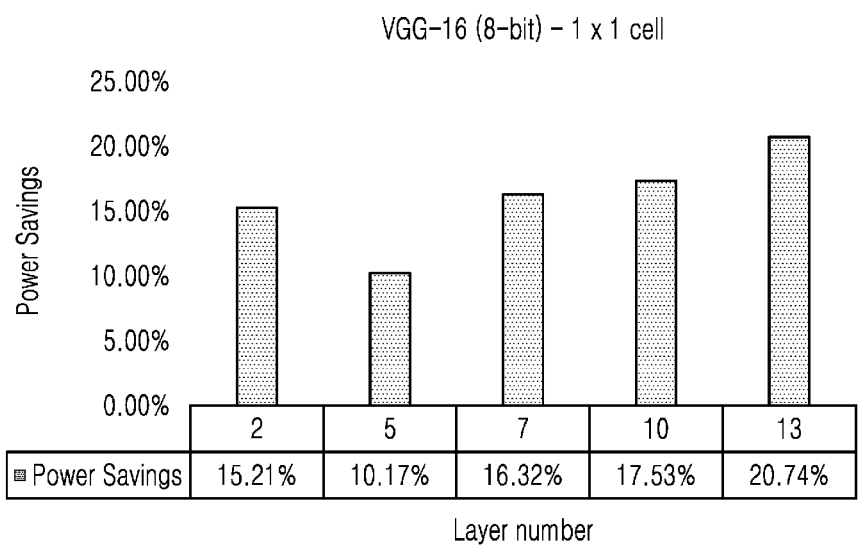
FIGS. 16A and 16B are graphs depicting power savings of a VGG-16 CNN, wherein the weights of the kernels of are composed of 8 bits, according to one or more embodiments.
Figure 16B:
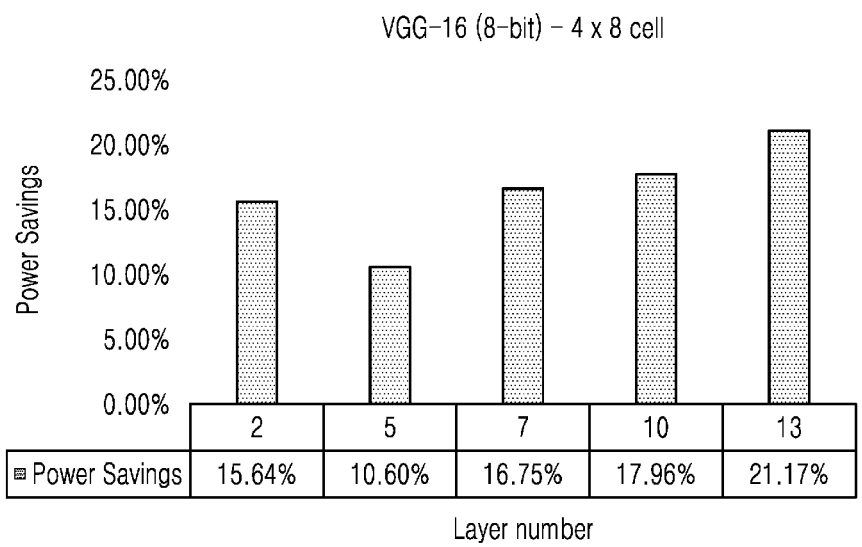

FIGS. 16A and 16B are graphs depicting power savings of the VGG-16 CNN, wherein the weights of the kernels may include 8 bits, according to one or more embodiments. The power savings may be achieved as product operations may be converted to addition operations, due to introduction of sparsity into the non-pivot kernels by identifying identical weights. This technique may minimize the load of the processor and may allow for saving power. As depicted in the one or more embodiments of FIG. 16A, for a 1×1 cell, a power saving of 16% may be achieved. As depicted in the one or more embodiments of FIG. 16B, for a 4×8 cell, a power saving of 16% may be achieved.

Figure 17A:
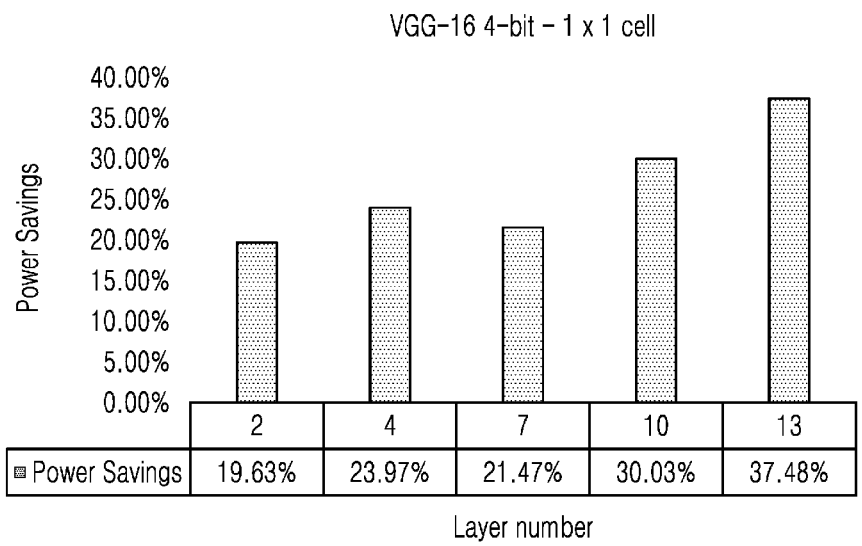
FIGS. 17A and 17B are graphs depicting power savings of a VGG-16 CNN, wherein the weights of the kernels of are composed of 4 bits, according to one or more embodiments.
Figure 17B:
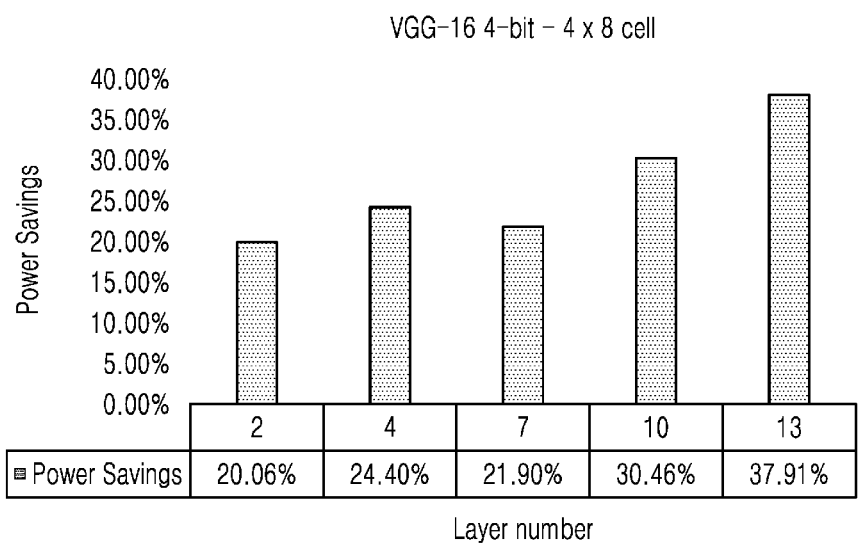

FIGS. 17A and 17B are graphs depicting power savings of the VGG-16 CNN, wherein the weights of the kernels may include 4 bits, according to one or more embodiments. As depicted in the one or more embodiments of FIG. 17A, for a 1×1 cell, a power saving of 27% may be achieved. As depicted in the one or more embodiments of FIG. 17B, for a 4×8 cell, a power saving of 27% may be achieved.

Figure 18A:
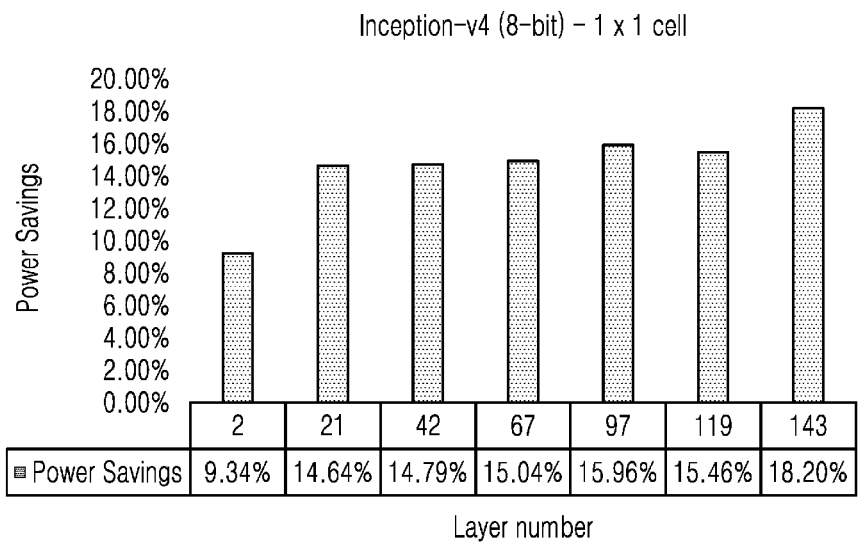
FIGS. 18A and 18B are graphs depicting power savings of an inception-version 4 CNN, wherein the weights of the kernels of are composed of 8 bits, according to one or more embodiments.
Figure 18B:
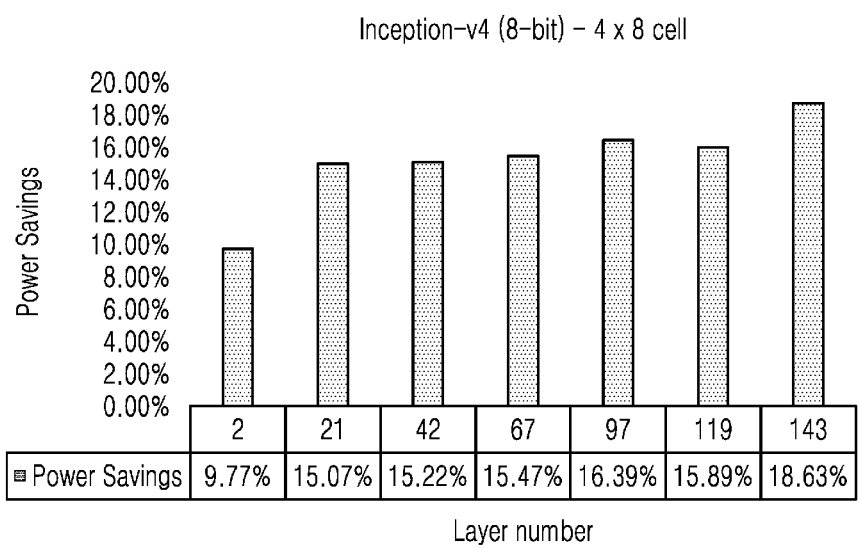

FIGS. 18A and 18B are graphs depicting power savings of the inception-version 4 CNN, wherein the weights of the kernels may include 8 bits, according to one or more embodiments. As depicted in the one or more embodiments of FIG. 18A, for a 1×1 cell, a power saving of 15% may be achieved. As depicted in the one or more embodiments of FIG. 18B, for a 4×8 cell, a power saving of 15% may be achieved.

Figure 19A:
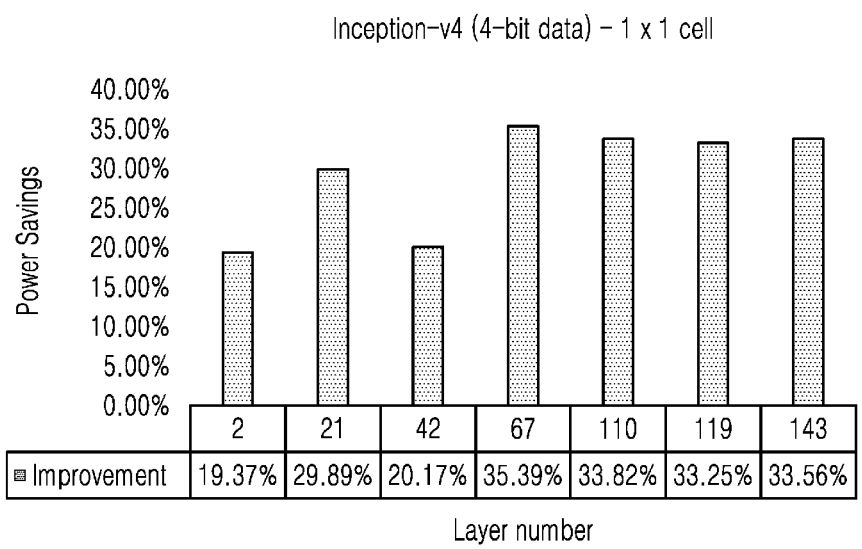
FIGS. 19A and 19B are graphs depicting power savings of an inception-version 4 CNN, wherein the weights of the kernels of are composed of 4 bits, according to one or more embodiments.
Figure 19B:
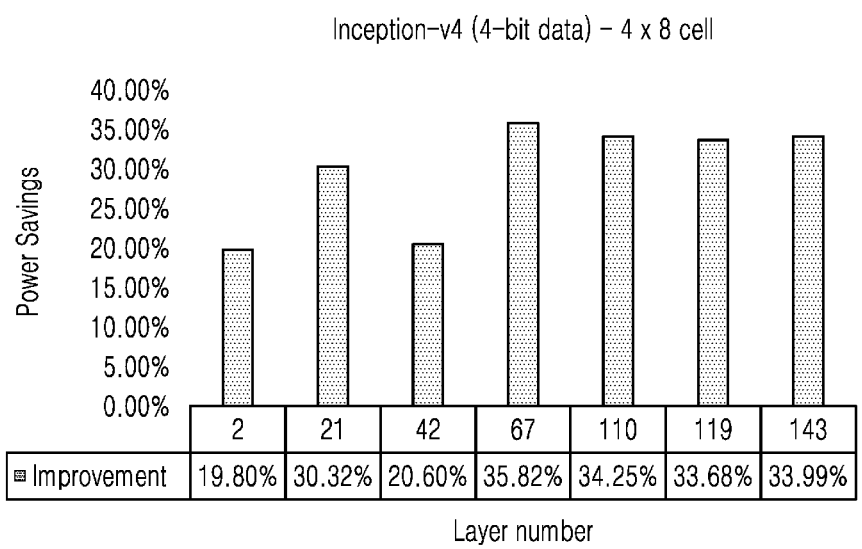

FIGS. 19A and 19B are graphs depicting power savings of the inception-version 4 CNN, wherein the weights of the kernels may include 4 bits, according to one or more embodiments. As depicted in the one or more embodiments of FIG. 19A, for a 1×1 cell, a power saving of 30% may be achieved. As depicted in the one or more embodiments of FIG. 19B, for a 4×8 cell, power saving of 30% may be achieved.

Figure 20A:
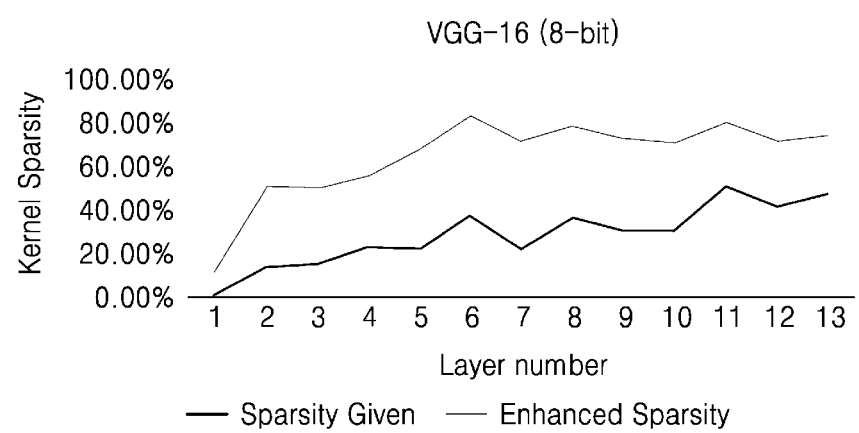
FIGS. 20A and 20B are graphs depicting enhancement of sparsity in non-pivot kernels of a VGG-16 CNN, introduced by detecting similar and identical weights by comparing the weights of the pivot kernel and the non-pivot kernels, according to one or more embodiments.
Figure 20B:
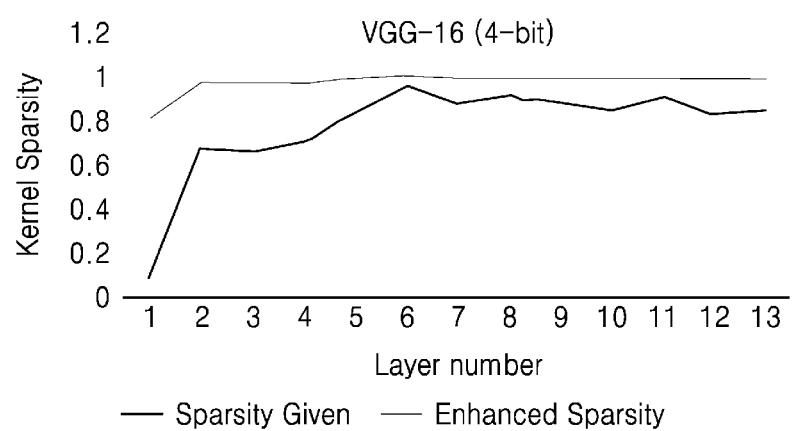

FIGS. 20A and 20B are graphs depicting enhancement of sparsity in non-pivot kernels of the VGG-16 CNN, introduced by detecting similar and identical weights by comparing the weights of the pivot kernel and the non-pivot kernels, according to one or more embodiments. The weights of the kernels of the VGG-16, depicted in FIG. 20a, may be composed of 8 bits. The weights of the kernels of the VGG-16, depicted in the one or more embodiments of FIG. 20B, may be composed of 4 bits. The weights of the pivot kernel and the non-pivot kernels may be compared to detect similar and identical weights. The values of the detected weights in the non-pivot kernels may be converted to zero, to introduce sparsity. For 8-bit VGG-16, the sparsity may increase by 36% after converting the similar and identical weights to 0. For 4-bit VGG-16, the sparsity may increase by 20% after converting the similar and identical weights to 0.

Figure 21A:
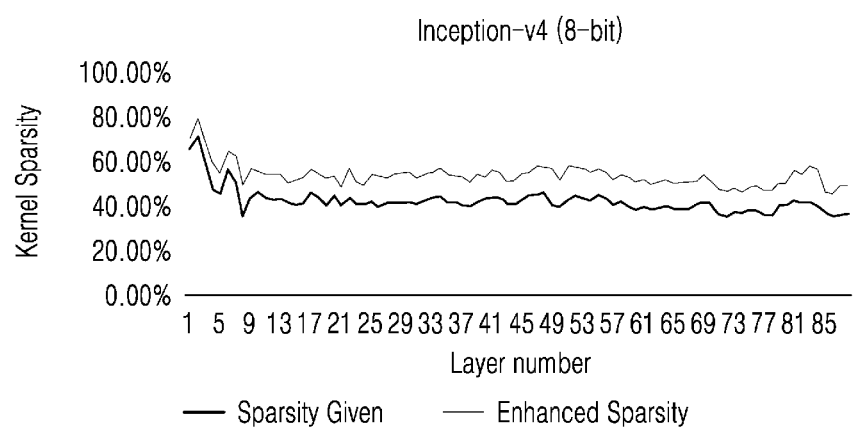
FIGS. 21A and 21B are graphs depicting enhancement of sparsity in non-pivot kernels of an inception-version 4 CNN, introduced by detecting similar and identical weights by comparing the weights of the pivot kernel and the non-pivot kernels, according to one or more embodiments.
Figure 21B:
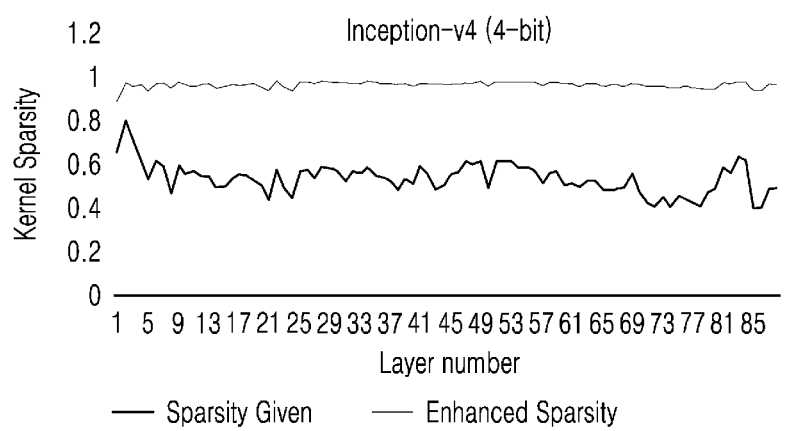

FIGS. 21A and 21B are graphs depicting the enhancement of sparsity into non-pivot kernels of the inception-version 4 CNN, introduced by detecting similar and identical weights by comparing the weights of the pivot kernel and the non-pivot kernels, according to one or more embodiments. The weights of the kernels of the inception-version 4 CNN, depicted in the one or more embodiments of FIG. 21A, may include 8 bits. The sparsity may increase by 12% after converting the similar and identical weights to 0. The weights of the kernels of the inception-version 4 CNN, depicted in the one or more embodiments of FIG. 21B, may include 4 bits. The sparsity may increase by 42% after converting the similar and identical weights to 0.

Figure 22A:
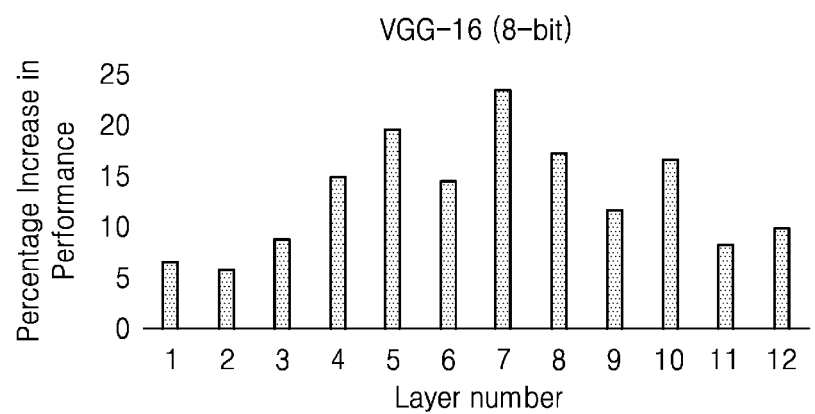
FIGS. 22A and 22B are graphs depicting performance improvement of a VGG-16 CNN achieved by detecting similar and identical weights by comparing the weights of the pivot and non-pivot kernels, according to one or more embodiments.
Figure 22B:
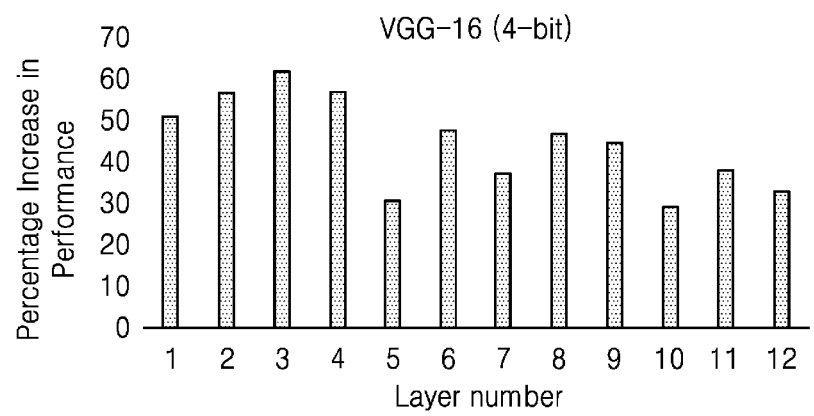

FIGS. 22A and 22B are graphs depicting performance improvement of the VGG-16 CNN achieved by detecting similar and identical weights by comparing the weights of the pivot and non-pivot kernels, according to embodiments. Because the detected similar and identical weights of the non-pivot kernels may be converted to 0 and products of weights of the pivot kernel and the IFM may be modified and broadcast to the non-pivot kernels, the computations of products of the IFM and the weights of the non-pivot kernels, that are similar and identical with the weights of the pivot kernels, may not be performed. The broadcasted products may be accumulated with the products of the non-zero weights and the IFM. Thus, multiplication operations may be converted to accumulation operations. Such a technique may reduce the computational complexity and may improve the performance of the VGG-16 CNN.

The weights of the kernels of the VGG-16 CNN, depicted in the one or more embodiments of FIG. 22A, may include 8 bits. The performance of the VGG-16 CNN may improve by 13.2%. The weights of the kernels of the VGG-16 CNN, depicted in the one or more embodiments of FIG. 22B, may include 4 bits. The performance of the VGG-16 CNN may improve by 44%.

Figure 23A:
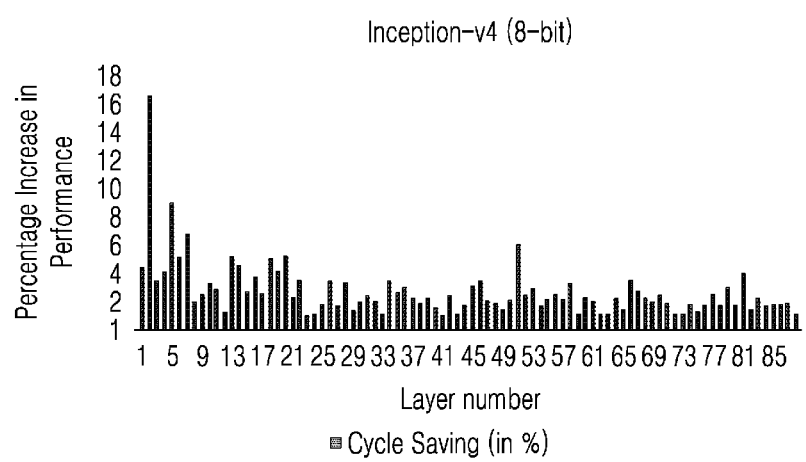
FIGS. 23A and 23B are graphs depicting performance improvement of an inception-version 4 CNN achieved by detecting similar and identical weights by comparing weights of the pivot and non-pivot kernels, according to one or more embodiments.
Figure 23B:
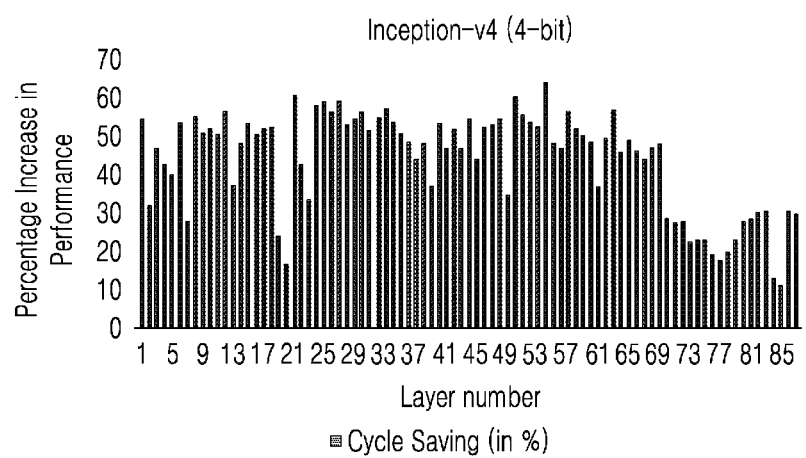

FIGS. 23A and 23B are graphs depicting performance improvement of the inception-version 4 CNN, achieved by detecting similar and identical weights by comparing weights of the pivot and non-pivot kernels, according to one or more embodiments. The weights of the kernels of the inception-version 4 CNN, as depicted in the one or more embodiments of FIG. 23a, may include 8 bits. The performance of the inception-version 4 CNN may improve by 3%. The weights of the kernels of the inception-version 4 CNN, as depicted in the one or more embodiments of FIG. 23B, may include 4 bits. The performance of the inception-version 4 CNN may improve by 44%.

The embodiments disclosed herein describe methods and systems for improving performance of a CNN by exploiting similar and/or identical weights across different kernels. Therefore, it is to be understood that the scope of the protection may be extended to such a program and in addition to a computer readable means having a message therein, such computer readable storage means contain program code means for implementation of one or more steps of the method, when the program runs on a server or mobile device or any suitable programmable device. The method may be implemented in one or more embodiments through or together with a software program written in e.g. Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The system 300, processor 301, NPU 302, broadcast network 303, system 600, processor 601, NPU 602, S/I-IKW function 603, system 800, NPU 802, system 900, NPU 902, system 1000, NPU 1002, system 1100, NPU 1102, and other elements in FIGS. 1-23B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-23B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for generating Output Feature Map (OFM) channels using a Convolutional Neural Network (CNN), comprising a plurality of kernels, the method comprising:
    generating, by one or more processors, one or more Inter-Kernel Weight (IKW) streams that respectively include encoded results of a comparison of weights of a pivot kernel and weights of at least one non-pivot kernel, wherein the pivot kernel and the at least one non-pivot kernel are among the plurality of kernels;
    generating, by the one or more processors, at least one respective converted non-pivot kernel by respectively sparsifying the at least one non-pivot kernel to generate the at least one respective converted non-pivot kernel, by respectively changing determined identical weights of the at least one non-pivot kernel to be a zero value weight within the at least one respective converted non-pivot kernel, and including existing values of determined unequal weights of the at least one non-pivot kernel within the at least one respective converted non-pivot kernel, with the determined identical weights and the determined unequal weights having been respectively identified based on the comparison of the weights of the pivot kernel and the weights of the at least one non-pivot kernel, and each of the at least one respective converted non-pivot kernel is a convolutional weight kernel that includes weight values;
    outputting the one or more Inter-Kernel Weight (IKW) streams and the at least one respective converted non-pivot kernel to a Neural Processing Unit (NPU);
    broadcasting, by the Neural Processing Unit (NPU), a product value corresponding to:
        a first product based on one pixel of an Input Feature Map (IFM) and one weight of the pivot kernel; or
        the first product and a second product that is based on the one pixel of the IFM and a value in a first IKW stream, among the one or more IKW streams, that corresponds to a first non-pivot kernel among the at least one non-pivot kernel;
    generating, by the NPU, a first OFM channel corresponding to the pivot kernel by accumulating a previous first OFM value with the first product;
    generating, by the NPU, a second OFM channel corresponding to the first non-pivot kernel by performing a convolution operation performed by multiplying one or more kernel weights, within a corresponding one of the at least one respective converted non-pivot kernels by values of pixels of the IFM, including accumulating a previous second OFM value with at least the broadcasted product value; and
    performing a bitwise splitting of accumulators in each of a pivot Multiply-Accumulate Unit (MAU) and at least one non-pivot MAU, wherein the pivot MAU includes a 2-input accumulator and the at least one non-pivot MAU includes a 3-input accumulator, such that one input of the 3-input accumulator is an output of the pivot MAU.

2. The method of claim 1, further comprising determining the identical weights in the at least one non-pivot kernel,
    wherein a first weight of the pivot kernel and a second weight of the at least one non-pivot kernel are considered identical if a condition is satisfied, wherein the condition is one of the first weight and the second weight being equal in magnitude and sign, and the first weight and the second weight being equal in magnitude and opposite in sign.

3. The method of claim 1,
wherein the one or more Inter-Kernel Weight (IKW) streams are one or more Similar or Identical Inter-Kernel Weight (S/I-IKW) streams, and the converting of the determined identical weights includes a converting of determined similar weights in the at least one non-pivot kernel to zero to further introduce the sparsity into the at least one non-pivot kernel, and
wherein a first weight of the pivot kernel and a second weight of the at least one non-pivot kernel are considered similar if a difference between magnitude of the first weight and the second weight is within a similarity threshold, wherein the first weight and the second weight are one of equal in sign and opposite in sign.

4. The method of claim 1, wherein a number of entries of the first IKW stream is based on a number of non-zero weights in the pivot kernel, wherein each entry of the first IKW stream is encoded based on a result of a determination of whether the weights of the pivot kernel and the weights of the first non-pivot kernel are determined to be one of unequal, identical, and similar,
wherein a first weight of the pivot kernel and a second weight of the at least one non-pivot kernel are considered similar if a difference between magnitude of the first weight and the second weight is within a similarity threshold, wherein the first weight and the second weight are one of equal in sign and opposite in sign.

5. The method of claim 1, wherein the pivot kernel is determined from among the plurality of kernels based on:
performing a mutual comparison of weights of each of the plurality of kernels, wherein the comparison is performed if locations of the weights of a kernel pair to be compared are identical;
determining a respective score of comparison for each of the plurality of kernels, wherein the respective score of comparison of a kernel among the plurality of kernels is determined by accumulating numbers of weights of the kernel that are determined similar or identical to the weights of each of the plurality of kernels excluding the kernel; and
selecting a kernel with a highest score among the respective scores of comparison as the pivot kernel, wherein kernels excluding the pivot kernel are identified to be the non-pivot kernels,
wherein a first weight of the selected kernel and a second weight of one of the plurality of kernels excluding the selected kernel are considered similar if a difference between magnitude of the first weight and the second weight is within a similarity threshold, wherein the first weight and the second weight are one of equal in sign and opposite in sign.

6. The method of claim 1, wherein the method further comprises performing a bitwise splitting of accumulators in each of a pivot Multiply-Accumulate Unit (MAU) and at least one non-pivot MAU, wherein the pivot MAU includes the pivot kernel and the at least one non-pivot MAU includes the at least one non-pivot kernel.

7. The method of claim 1, wherein each of the kernels has dimensions of size H, W, and Z in a channel direction, and H equals W.

8. The method of claim 1, wherein the NPU performs the generating of the first OFM channel in parallel with the generating of the second OFM channel.

9. A non-transitory computer-readable storage medium storing instructions that, when executed by one or more processors, cause the one or more processors to perform the method of claim 1.

10. A system for generating Output Feature Map (OFM) channels using a Convolutional Neural Network (CNN), comprising a plurality of kernels, the system comprising:
one or more processors configured to:
generate one or more Inter-Kernel Weight (IKW) streams that respectively include encoded results of a comparison of weights of a pivot kernel and weights of at least one non-pivot kernel, wherein the pivot kernel and the at least one non-pivot kernel are among the plurality of kernels;
generate at least one respective converted non-pivot kernel by respectively sparsifying the at least one non-pivot kernel to generate the at least one respective converted non-pivot kernel, through respective changings of determined identical weights of the at least one non-pivot kernel to be a zero value weight within the at least one respective converted non-pivot kernel and including existing values of determined unequal weights of the at least one non-pivot kernel within the at least one respective converted non-pivot kernel, with the determined identical weights and the determined unequal weights having been respectively identified based on the comparison of the weights of the pivot kernel and the weights of the at least one non-pivot kernel, and each of the at least one respective converted non-pivot kernel is a convolutional weight kernel that includes weight values; and
output the one or more Inter-Kernel Weight (IKW) streams and the at least one respective converted non-pivot kernel to a Neural Processing Unit (NPU); and
the Neural Processing Unit (NPU) configured to:
broadcast a product value corresponding to:
a first product based on one pixel of an Input Feature Map (IFM) and one weight of the pivot kernel; or
the first product and a second product that is based on the one pixel of the IFM and a value in a first IKW stream, among the one or more IKW streams, that corresponds to a first non-pivot kernel among the at least one non-pivot kernel;
generate a first OFM channel corresponding to the pivot kernel by accumulating a previous first OFM value with the first product;
generate a second OFM channel corresponding to the first non-pivot kernel by performing a convolution operation performed through multiplying of one or more kernel weights, within a corresponding one of the at least one respective converted non-pivot kernels, by values of pixels of the IFM, including accumulating a previous second OFM value with at least the broadcasted product value; and
performing a bitwise splitting of accumulators in each of a pivot Multiply-Accumulate Unit (MAU) and at least one non-pivot MAU, wherein the pivot MAU includes a 2-input accumulator and the at least one non-pivot MAU includes a 3-input accumulator, such that one input of the 3-input accumulator is an output of the pivot MAU.

11. The system of claim 10, wherein the one or more processors are further configured to determine the identical weights in the at least one non-pivot kernel,
wherein a first weight of the pivot kernel and a second weight of the at least one non-pivot kernel are considered identical if a condition is satisfied, wherein the condition is one of the first weight and the second weight being equal in magnitude and sign, and the first weight and the second weight being equal in magnitude and opposite in sign.

12. The system of claim 10,
wherein the one or more Inter-Kernel Weight (IKW) streams are one or more Similar or Identical Inter-Kernel Weight (S/I-IKW) streams, and the conversion of the determined identical weights includes a conversion of determined similar weights in the at least one non-pivot kernel to zero to further introduce the sparsity into the at least one non-pivot kernel, and
wherein a first weight of the pivot kernel and a second weight of the at least one non-pivot kernel are considered similar if a difference between magnitude of the first weight and the second weight is within a similarity threshold, wherein the first weight and the second weight are one of equal in sign and opposite in sign.

13. The system of claim 10, wherein a number of entries of the first IKW stream is based on a number of non-zero weights in the pivot kernel, wherein each entry of the first IKW stream is encoded based on a result of a determination of whether the weights of the pivot kernel and the weights of the first non-pivot kernel are determined to be one of unequal, identical, and similar,
wherein a first weight of the pivot kernel and a second weight of the at least one non-pivot kernel are considered similar if a difference between magnitude of the first weight and the second weight is within a similarity threshold, wherein the first weight and the second weight are one of equal in sign and opposite in sign.

14. The system of claim 10, wherein, for a determination of the pivot kernel from among the plurality of kernels, the one or more processors are further configured to:
perform a mutual comparison of weights of each of the plurality of kernels, wherein the comparison is performed if locations of the weights of a kernel pair to be compared are identical;
determine a respective score of comparison for each of the plurality of kernels, wherein the respective score of comparison of a kernel among the plurality of kernels is determined by accumulating number of weights of the kernel that are determined similar or identical to the weights of each of the plurality of kernels excluding the kernel; and
select a kernel with a highest score among the respective scores of comparison as the pivot kernel, wherein kernels excluding the pivot kernel are identified to be the non-pivot kernels,
wherein a first weight of the selected kernel and a second weight of one of the plurality of kernels excluding the selected kernel are considered similar if a difference between magnitude of the first weight and the second weight is within a similarity threshold, wherein the first weight and the second weight are one of equal in sign and opposite in sign.

15. The system of claim 10, wherein the system is further configured to perform a bitwise splitting of accumulators in each of a pivot Multiply-Accumulate Unit (MAU) and at least one non-pivot MAU, wherein the pivot MAU includes the pivot kernel and the at least one non-pivot MAU includes the at least one non-pivot kernel.

16. The system of claim 10, wherein each of the kernels has dimensions of size H, W, and Z in a channel direction, and H equals W.

17. The system of claim 10, wherein the NPU is further configured to perform the generation of the first OFM channel in parallel with the generation of the second OFM channel.

18. The method of claim 1, wherein the broadcasting further comprises selectively determining between the product value being based on the first product and the product value being based on the first product and the second product.

19. The system, of claim 10, wherein, for the broadcasting, the NPU is further configured to selectively determine between the product value being based on the first product and the product value being based on the first product and the second product.

* * * * *